US005606690A

United States Patent [19]
Hunter et al.

[11] Patent Number: 5,606,690
[45] Date of Patent: Feb. 25, 1997

[54] NON-LITERAL TEXTUAL SEARCH USING FUZZY FINITE NON-DETERMINISTIC AUTOMATA

[75] Inventors: Kenneth M. Hunter, San Francisco; Michael G. Roberts, Mountain View; Harry T. Garland, Los Altos, all of Calif.

[73] Assignee: Canon Inc., Tokyo, Japan

[21] Appl. No.: 330,968

[22] Filed: Oct. 28, 1994

Related U.S. Application Data

[63] Continuation-in-part of Ser. No. 110,093, Aug. 20, 1993, abandoned.

[51] Int. Cl.$^6$ .............................. G06F 17/30; G06F 7/04
[52] U.S. Cl. ...................... 395/605; 382/229; 364/222.2
[58] Field of Search .............................. 395/600; 382/37; 364/419.13, 300

[56] References Cited

U.S. PATENT DOCUMENTS

| | | | |
|---|---|---|---|
| 4,453,217 | 6/1984 | Boivie | 364/300 |
| 5,138,669 | 8/1992 | Shimura et al. | 382/37 |
| 5,369,577 | 11/1994 | Kadashevich et al. | 364/419.13 |

FOREIGN PATENT DOCUMENTS

| | | | |
|---|---|---|---|
| 0271664A2 | 6/1988 | European Pat. Off. | G06F 15/40 |

OTHER PUBLICATIONS

Brunner and Korfhage, "An Automatic Improvement Processor For An Information Retrieval System," *Proc. 2nd International Conference on Expert Database Systems*, ed. by L. Kerschberg, Apr. 1988, pp. 449–468.

Kharin, "Context–Morphological Method of Iterative Search for Textual Informational", *11444 Automatic Documentation & Mathematic Linguistics*, vol. 25, 1991, pp. 13–19, Seriya 2, No. 6, New York, New York.

Kobayashi, Imamura, Takahashi, Kubota, Kanaoka, Hamamoto, and Tomita, "A Searching Method of the Most Similar String in The File of a Document Retrieval System", *8169 Systems and Computers in Japan*, vol. 23, No. 2, 1992, New York, New York, pp. 24–38.

Schek, H. J., "Tolerating Fuzziness in Keywords by Similarity Searches", Kybernetes, 1977, vol. 6, pp. 175–184.

Manber, Udi et al., "Approximate String Matching with Arbitrary Costs for Text and Hypertext", Department of Computer Science, University of Arizona, Feb. 1990.

Feldman, Yosee, et al., "Spatial Machines: A More Realistic Approach to Parallel Computation", Communications of the ACM, Oct. 1992, vol. 35, No. 10, pp. 61–73.

Baeza–Yates, Ricardo, et al., "A New Approach to Text Searching", Communications of the ACM, Oct. 1992, vol. 35, No. 10, pp. 74–82.

Wu, Sun, et al., "Fast Text Searching Allowing Errors", Communications of the ACM, Oct. 1992, vol. 35, No. 10, pp. 83–91.

Hopcroft, John E., et al., "Introduction to Automata Theory, Languages, and Computation", Addison–Wesley Publishing Company, 1979, pp. 13–29.

*Primary Examiner*—Thomas G. Black
*Assistant Examiner*—Cheryl R. Lewis
*Attorney, Agent, or Firm*—Stuart P. Meyer; Edward J. Radlo; Elizabeth F. Enayati

[57] ABSTRACT

Method and system for selectively retrieving information contained in a stored document set using a metric-based or "fuzzy" finite-state non-deterministic automaton. An automaton is constructed (501) corresponding to a text string query, text strings are read (502) from storage and corresponding dissimilarity values are generated (505). Those strings resulting in values less than a given threshold are recorded (508) and listed for the user. Dissimilarity values are determined based on penalties associated with missing characters, extra characters, incorrect characters, and other differences between the text string query and a text string read from storage.

26 Claims, 15 Drawing Sheets

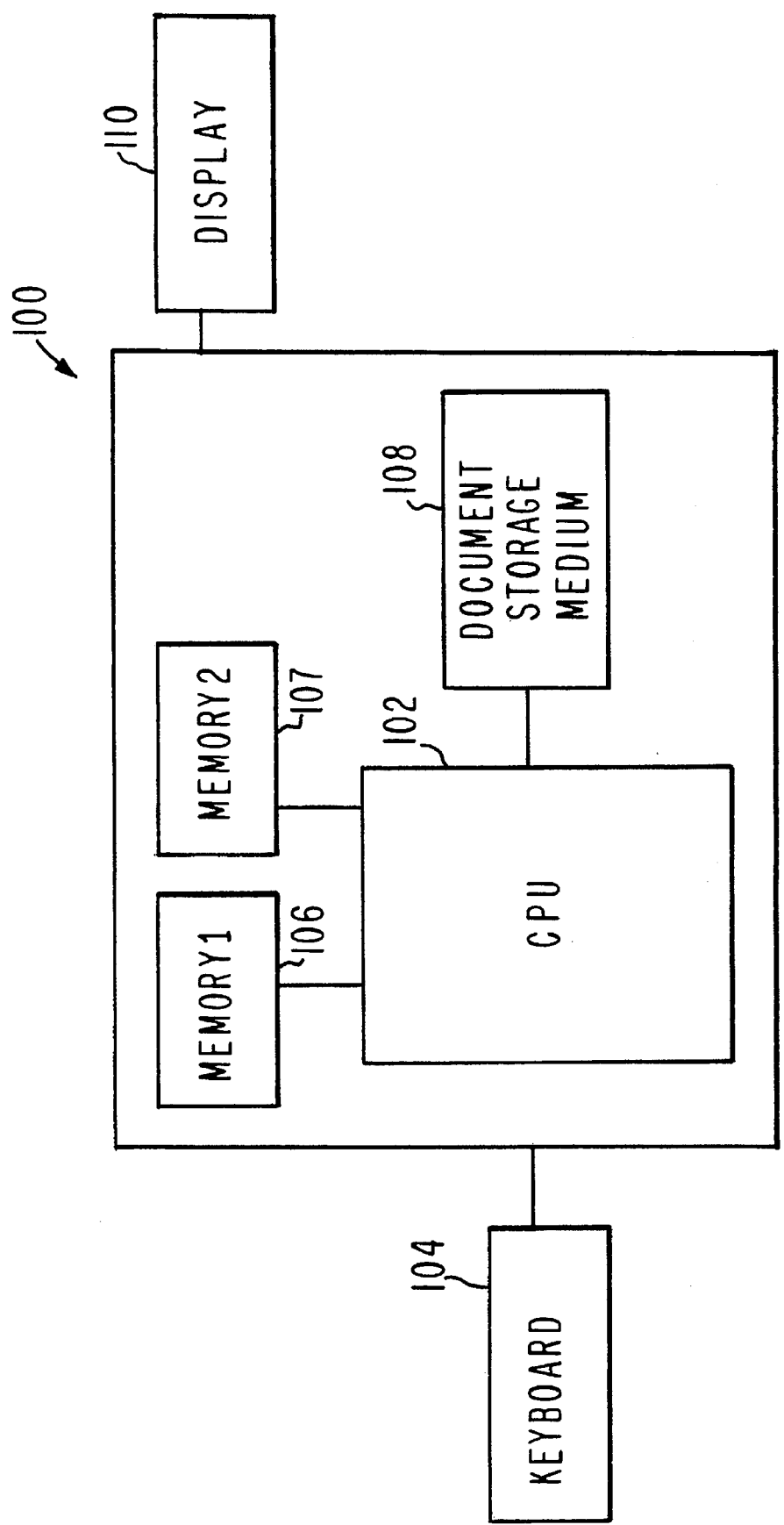

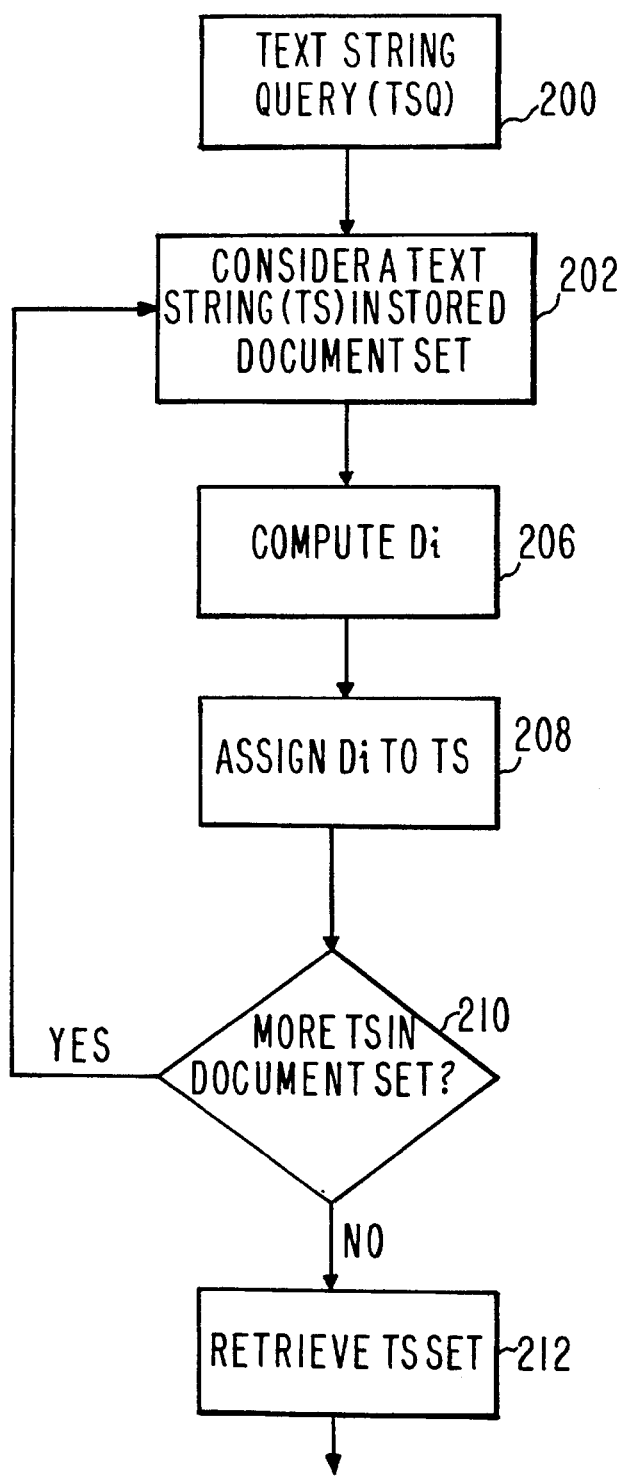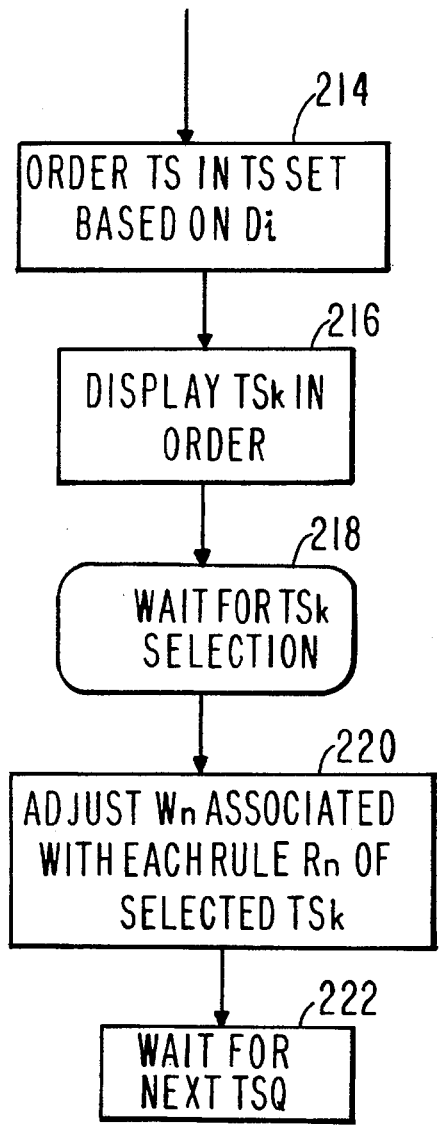
FIGURE 2A
FIGURE 2B

NON-LITERAL TEXTUAL SEARCH USING FUZZY FINITE NON-DETERMINISTIC AUTOMATA

RELATED APPLICATION

The instant application is a continuation-in-part of U.S. patent application Ser. No. 08/110,093, filed on Aug. 20, 1993 and now abandoned.

BACKGROUND OF THE INVENTION

1. Field of the Invention

The present invention relates generally to the field of document storage and retrieval systems of the type used for multiple document manipulation. Specifically, the invention relates to a method and system for selectively searching and retrieving information from stored documents using a non-literal search strategy employing metric-based or "fuzzy" finite non-deterministic automata.

2. Brief Description of Background Art

Electronic storage of documents has facilitated the handling of large volumes of documents, such as those handled by hospitals, universities, government institutions, and the like. Typically, the documents are entered into massive storage systems by various means, including direct typing, receipt of electronic mail, and scanning. Scanning systems often utilize optical character recognition (OCR) that converts text portions of scanned images into electronic data. Stored documents thus may contain mixtures of images, text, and annotations such as key words, and may be stored in various electronic forms. Selective retrieval of information from the stored document set poses significant problems due to the volume of information to be searched.

Existing archival and retrieval systems support a variety of search technologies. These include automatic or user defined indexing, key word annotation, automatic key word extraction, full text search, preprocessed indexing of some or all words or phrases in the text, and both literal and non-literal searches.

Typical existing systems assign an index to each document as it is entered into storage. The index may be a system-generated or a user-defined code associated with each document. The code then is stored together with the document. To retrieve a document, a user must enter the appropriate code associated with the desired document. Other systems use key words in a similar manner. There are many methods for identifying and assigning key words to a document, including direct keyboard entry by the user, interactive selection from the document text by the user, and automated extraction by a search of the document text. Once key words have been assigned to documents, the user may then use them to retrieve a document. The problem encountered with such systems is that a user may retrieve only entire documents, and must know the index, code, or key words associated with a desired document.

Full text search systems permit users to access selected information from a document set by entering a search term into the system. The system then reads through the entire document set to find an exact match for the entered search term. This has the benefit of locating particular instances of strings within the document text. These locations facilitate features such as proximity searching, where the search expression may contain restrictions on the relative locations of document set text strings that match certain portions of the search expression. The problem encountered with such systems is that each search involves a complete pass across the entire document set text, which makes such searches slow for very large document sets.

Preprocessed, or indexed, search systems typically create tables of words found in the document set text. These tables greatly increase the efficiency of searches over large document sets. For example, in a very simple embodiment, the search is initially performed over the tables, and then only for documents that the tables indicate contain desirable target words. The tables can be sorted and cross-indexed in various standard ways to optimize performance in specific situations.

However, for both full text and indexed search systems, in some instances there may be a mismatch between the search term and the term in the document set. For example, a user may enter a wrong or unintended search term, such as by making a keyboarding or other error when entering the search term. As another example, there may be an error in the original text, OCR, or manually entered key word. Literal search systems that require exact matches are incapable of handling such mismatches between entered search terms and document set text, and would be unable to retrieve a desired document in such cases.

A non-literal, or "fuzzy", search system is capable of handling mismatches. Use of such a system involves entering a text string into a computer system and then searching for a "close" match of that text string in a stored text file. For example, a user may request a search on "recieve" (spelled incorrectly), and the system may find the correctly spelled word "receive". In another example, if the stored text file is obtained from OCR of an optically scanned document, often the OCR system misrecognizes characters that are typographically similar. The letter "O" may be misrecognized as the numeral "0", or the letter pair "rn" may be misrecognized as the single letter "m". In these instances, it would be desirable to retrieve text that is typographically close to the input text string.

Known fuzzy search techniques are not well adapted to the task of finding documents containing words "close" to search terms. For example, a technique described in R. Baeza-Yates and G. Gonnet, "A New Approach to Text Searching", COMMUNICATIONS OF THE ACM 35, 10 (Oct. 1992), 74–82, finds matches between a target word and a search term where the target word contains mismatched characters, but does not describe a technique to successfully handle missing characters, extra characters, or exchanged adjacent characters. A second technique, described in S. Wu and U. Manber, "Fast Text Searching Allowing Errors", COMMUNICATIONS OF THE ACM 35, 10 (Oct. 1992), 83–91, supports only the use of small integer costs associated with mismatched characters, missing characters, or extra characters, thereby severely restricting the ability to fine-tune these costs, such as is required in the situation in which adaptive fine-tuning of the costs is desirable. In addition, their technique supports exchanged adjacent characters only as a combination of a missing and an extra character, so that the cost for exchanged adjacent characters is found only as the sum of the costs for a missing character and an extra character. To perform a fuzzy search, the Wu and Manber technique involves performing a search first for matches with no errors, then with one error, and so forth until sufficient matches are found.

A third technique, also developed by U. Manber and S. Wu, is described in a paper "Approximate String Matching with Arbitrary Costs for Text and Hypertext" dated February, 1990, and included in August, 1992 in the IAPR Workshop on Structural and Syntactic Pattern Recognition, Bern, Switzerland, handles missing and extra characters. The authors note "one drawback of the algorithm is that it cannot handle substitutions; that is, we assume that the cost of replacing one character by another is the same as the cost of deleting the first character and inserting the second." A similar problem exists with regard to exchanged adjacent characters.

A fourth technique, described in U.S. Pat. No. 4,985,863 by Fujisawa et. al., 1991, uses finite deterministic automata to search only literally for exact matches, but encodes into the OCR document text alternative identifies of characters for which OCR had little certitude. This reference provides no support for missing characters, extra characters, or exchanged adjacent characters, and provides no general support for mismatched characters.

While each of these techniques, may be suitable for specific limited uses, they are inconvenient for general use in finding a text string based on a search term when the number and type of errors in the search term is unknown. This limitation becomes especially acute as the number of distinct words in the document set grows very large.

Finite state automata have known uses in computer systems to parse a series of symbols to determine whether they match a specified pattern, where the symbols being analyzed are members of a finite symbol set, such as ASCII character codes. An automaton starts operation from an initial state or an initial set of states, and then sequentially processes an incoming stream of symbols. As each incoming symbol is processed, the automaton undergoes a change of state or states, depending on the previous state or states of the automaton and the identity of the incoming symbol. If and when the automaton reaches a terminal state just as the last of the incoming symbols is processed, the incoming stream of symbols is found to match a particular pattern that the automaton was constructed to identify. Otherwise, the stream is found to not match any of the patterns that the automaton was constructed to identify.

Automata may be either deterministic or non-deterministic. In a deterministic automaton, at each point in time, the automaton has a single current state, and there is a particular symbol which is going to be examined next. In the easiest cases, the result of processing that next symbol is that the automaton is put into a single successor current state, which may be the same state but in any event is completely determined by the predecessor state and the input symbol. This process continues until all the symbols have been processed, a terminal state has been reached, or an incoming character is received for which there is no valid transition.

Depending on the design of the deterministic automaton and the succession of states and input symbols, there may arise cases where there is more than one viable next state. Since only one state may be current at one time, the automaton is copied as many times as there are viable next states, and each copy follows a different path through the sequence of states and next symbols. This tree of state sequences can have very large fanout, leading to great inefficiencies in processing. Even with backtracking, the process is fundamentally inefficient. The various sequences of successor states are exhaustively searched, one at a time, using backtracking whenever a particular path of states does not ultimately lead to a terminal state. As the tree of state sequences that needs examination grows, the amount of time required to perform such searching increases.

In a non-deterministic automaton, multiple current states are permitted, and incoming symbols may result in a change from each current state to any of several successor states. When the end of the incoming symbol stream is reached, a search is made to determine whether any of the current states of the automaton is a terminal state. If so, the incoming stream is found to match at least one of the patterns, although there may be no way to tell which particular pattern was matched.

Deterministic automata are usable for such searching for small sets of known patterns, but are ill-suited for general use.

There remains a need for an efficient general method and system for selectively retrieving information from a document set based on a potentially incorrect search term, and there remains an opportunity to apply finite non-deterministic automata technology to non-literal searching.

SUMMARY OF THE INVENTION

The present invention is a method and system for selectively retrieving information contained in a stored document set using a non-literal search strategy that employs metric-based or "fuzzy" finite non-deterministic automata.

The system includes a data input device (104) for transmitting a user-defined text string query to a processor (102). A finite non-deterministic automaton (450) is constructed corresponding to the text string query. Stored words (460) are applied to the automaton (450), which generates a dissimilarity value associated with each such stored word. A display (470) provides a user with a sorted list of the stored words having dissimilarity values below a threshold value.

In one aspect of the invention, the system determines dissimilarity values by adding penalty values to transitions between states of the automaton based on differences between the query and the word under examination. Such differences include extra characters, missing characters, exchanged adjacent characters, and different characters.

The present invention further includes a method incorporating the functions of the described system. The invention is further described in the following detailed description and figures.

BRIEF DESCRIPTION OF THE DRAWINGS

FIG. 1 shows a block diagram of an embodiment of the present invention.

FIGS. 2A–2B depict a flow chart of the present invention.

DETAILED DESCRIPTION OF THE PREFERRED EMBODIMENTS

Figure 3:
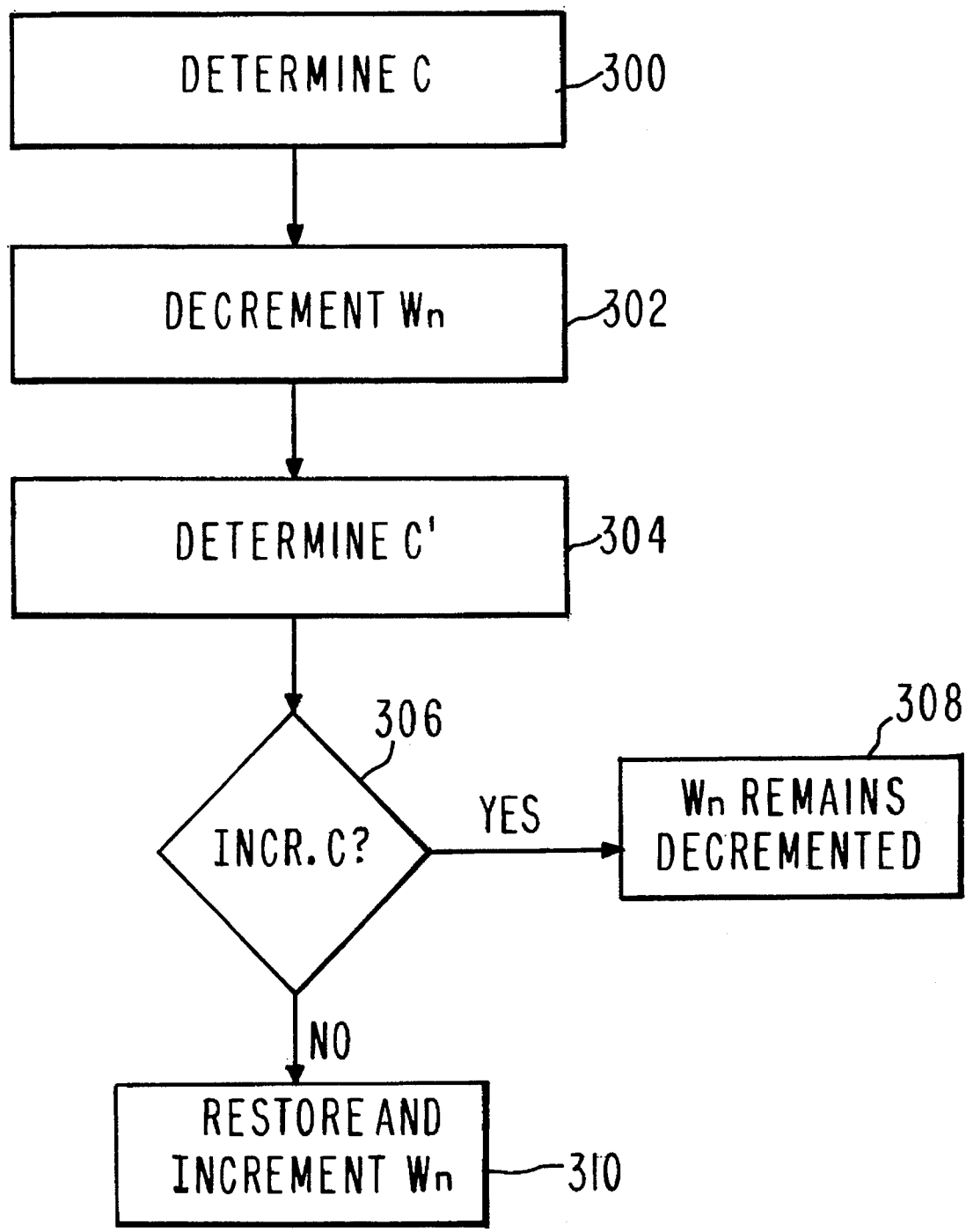
FIG. 3 depicts a flow chart of one embodiment of the present invention relating to determining an adaptive measure of association.

The present invention relates to retrieving words or other information from a document set or other data set stored on a computer. A user may wish to retrieve a document, or a portion of a document, based on a search term. However, for a variety of reasons, there may be a mismatch between the search term entered by the user and the desired corresponding text string in a document set. The present system and method enable retrieval of a variety of "close" text strings from a document set based on the entered search term, and display of the retrieved text strings in an order that reflects an adaptive aspect of the system. This retrieval is accomplished using a finite non-deterministic automaton.

One problem in designing such non-literal search systems is in defining how "close" a word in the document set must be for it to be considered a match with the search term. The present invention addresses that problem by solving a related problem: given a set of rules and associated "penalty" values for making specific changes in a word, determine the least total penalty for using those rules to change a word in the document set so that it would be identical to the search term. That minimal penalty value is then taken as the distance between the word and the search term. All words in the document set may then be ranked according to their distance from the search term. The words with the least distance are then deemed the "closest" to the search term, and displayed accordingly. Fuzzy finite non-deterministic automata of the instant invention provide an efficient means of calculating such minimal penalty distance measures arising from such rule sets.

There may be many rules in the rule set. Such rules include "different symbol", the substitution of one symbol for another; "extra symbol" and "missing symbol", the addition and deletion of symbols; and "exchanged adjacent symbols", swapping the ordinal positions of two neighboring symbols in a word. For example, a mismatch between document set words and search term might arise when a user intends to search on the term "monkey", but instead types in "mankey" or even "makney". The rule set described then provides the means for changing the document set word "monkey" to either "mankey" or "makney" through various sequences of substitutions, deletions, additions, swaps and other rules.

Numerous types of rules are allowed in the rule set. Consequently, it is quite possible for there to be alternative rule sequences that achieve the same overall change in a document set word. For example, "monkey" can be transformed to "mankey" by a one-step process of substituting an 'a' for the 'o'. It can also be obtained in a two-step process by operating on the 'o' with a character deletion rule, and then inserting an 'a' with a character addition rule. While these examples all utilize single or neighboring character actions, multiple character and other complex action rules are included in the scope of this invention.

Each time a rule is used, its associated penalty value is accrued to the total penalty for all the changes so far made to a word. The penalty value of each rule can be independent of the values of other rules. Hence, there will generally be different accrued penalties for different rule sequences that could each achieve the desired conversion of one word to another. Continuing the above example, if the penalty for substituting an 'a' for an 'o' is 5, the penalty for deletion of an 'a' is 3 and the penalty for addition of an 'o' is 1, then there is less penalty accrued for performing the two-step conversion than for application of the single-step rule.

While there may be many rules, and many allowed sequences of the applications of those rules which can convert one word into another, there will exist a single minimal penalty value that must be accrued to use the rules to perform the conversion. There may be many equivalent sequences of rule applications that achieve that lowest penalty value for the conversion, or there may be a unique sequence of changes for that minimal value. But a minimal value will exist for any given set of rules, associated penalties, and pairs of words. That minimal value is then taken as the distance between the two words.

The present invention provides a technique for the determination of that minimal penalty value, given a document set, a search term, and a set of rules and penalties. In the context of the ongoing example, the present invention likely retrieves "monkey" and displays the word in a displayed list of retrieved terms.

The present invention further comprises methods to adjust the individual penalty value for each rule so as to increase the likelihood that the system presents desirable non-literal matches in future searches. This capability uses feedback that is obtained from the user, directly or indirectly, on the performance of past searches.

Turning to FIG. 1, the present system 100 includes a computer processor 102 that is in communication with an input device 104, such as a keyboard, at least one memory device 106, and an output display device 110. The processor 102 also is in communication with a storage medium 108 containing a stored document set. The storage medium 108 may be used to store information contained in a document set that is typed, scanned, entered using optical character recognition technology, or entered using any technology known and available to those skilled in the art of document storage.

In a preferred embodiment of the present system, the storage medium 108 and the processor 102 are contained within a single housing, forming a self-contained system. In alternative embodiments, the storage medium 108 may be located in a remote location, accessible by the processor 102 via a network, cables, or other medium of transferring information.

FIGS. 2A–2B show a functional block diagram of the present system 100. The processor 102 receives a text string query (TSQ) 200 from the input device 104. The query may include a search term, phrase, or any other series of characters or single characters which a user requests from the document set stored in the document storage medium 108. The system 100 next considers 202 a first text string in the stored document set. The first text string considered 202 may either be the first text string in the stored document set, or may be any one of the text strings in the stored document set designated as a "first" text string for purposes of the present system.

A dissimilarity value $D_i$ next is determined 206 and then assigned 208 to the document text string considered at step 202. There are several methods known and available to those skilled in the art which may be used to determine a dissimilarity value $D_i$. Thus, any method for determining a dissimilarity value $D_i$ may be incorporated into the inventive system.

In a preferred embodiment, the $D_i$ calculation 206 for any text string is stopped before it completes, when it is determined that the value of $D_i$ will exceed a threshold value that may be a function of prior values obtained in the loop of steps 202–210 for other words in the stored document set. If the calculation is stopped, then that text string is given an arbitrarily large $D_i$ value, so that it will not be displayed 216.

In a preferred embodiment, the dissimilarity value $D_i$ is defined as:

$$D_i = MIN \sum_{1}^{k} r_n w_n \qquad (Eq.\ 1)$$

wherein $r_n$ is the number of times a particular rule $R_n$ from the first set of rules stored in memory 106 must be applied to the document text string in coordination with the application of other rules to create a text string that matches the pattern specified by the text string query, k is the number of rules, $w_n$ is the non-negative weight assigned to each rule, and the minimization is performed over all possible sequences of rule applications that could successfully convert the document text string to match the pattern of the text string query.

The first set of rules stored in memory 106 is a set of manipulations that may be considered in the aggregate to modify the document text string such that the document text string matches the pattern specified by the text string query. Exemplary manipulations may include extra character, missing character, different character, exchanged adjacent characters, different case character/case sensitive, different case character/case insensitive, extra or missing prefix, suffix, or root characters. There are many additional rules that may exist and that may be used, including variations of these defined rules. These exemplary manipulations may be defined as follows:

"Extra character" means that the document text string includes an extra character that is not part of the text string query. For example, while the query is for the word "misuse", the document text string is the term "missuse". In that example, a single extra character "s" is included in the document text string that does not appear in the query.

"Missing character" means that a character that is part of the text string query is omitted from the document text string. For example, while the query is for the word "conscious", the document text string is "consious", or "concious".

"Different character" means that a character that is part of the document text string is used in place of a desired character. For example, while the query is for the word "bounce", the document text string is "bounse", "bownce", and the like. In each of those examples, a non-matching symbol is to be replaced by a matching letter.

"Exchanged adjacent characters" means that adjacent characters in a document text string are exchanged. For example, while the query is for the word "receive", the document text string is "recieve".

"Different case character/case sensitive" means that, in a case-sensitive search, the document text string includes a mismatched case character. For example, while the text string query is "America", the document text string is "america", without the initial capital "A".

"Different case character/case insensitive" means that, in a search where the case of the characters is relatively unimportant, the document text string includes a character having a case that does not match its counterpart in the text string query. For example, a document text string appears in all capital letters even though the search is case insensitive and the text string query may or may not include capital letters.

Variations on case sensitivity include case sensitive/insensitive for every letter in a word, case sensitive only for the initial letter (as in the example above), and case insensitive only for the initial letter but case sensitive for every other letter in a word. Case sensitivity also may depend on location with respect to stems, roots, prefixes, and suffixes.

"Extra or missing prefix, suffix, or root characters" means, that a block of adjacent characters are added to or deleted from a document text string. For example, while the text string query is for the word "exist", if the word "exist" is not found, it may be the case that "preexist" is found and is the closest match. The prefix "pre", constituting a block of adjacent characters, may be deleted from "preexist" with a possibly lower weight than deleting each of the characters "p", "r", and "e" individually.

Each of the rules defined above may be a single rule, or may represent a class of rules that address the same problem. For example, the rule "different character" may be a set of rules having one rule that assigns a penalty associated with the character "l" instead of the numeral "1", another rule that assigns a penalty associated with the character "O" instead of the numeral "0", and the like for OCR text. The set of rules $R_n$ are not necessarily exclusive, in the sense that "bounce" also can be obtained from "bounse" by the application of both the extra character rule, to yield "boune", and the missing character rule, to yield the target "bounce".

Other types of manipulations and search strategies that may be included as rules in the present system may include heuristic rules such as a thesaurus rule in which related words are found in a search, a phonetic rule in which phonetically equivalent, or nearly equivalent, words are found in a search, a language translation rule, and a prefix/suffix removal rule that finds all words having the same root. Rules may involve specification that a symbol or string of symbols in a search term are optional, or may be repeated, or may be either optional or repeated. A rule may support an extra or omitted hyphen, so that "auto-immune" and "autoimmune" would be treated as equivalent, or nearly equivalent. Since OCR processing often inserts extra spaces or deletes intended spaces, a rule may support the identification of "ofthe" and "of the" as equivalent, or nearly equivalent. Rules may support common spelling errors, such as using the wrong vowel, or spelling "photo" as "foto". Other rules known to those skilled in the art may be included in the rule set and are anticipated as being included in the rule set of the present system.

Penalties associated with rules may be smaller for characters which appear later in the incoming stream, or for transition to later states in a fuzzy automaton. For example, it may be desirable to regard the strings "tilt" and "tilts" as more similar to each other than the strings "tilt" and "stilt".

The next step 210 is a check whether there are additional text strings in the document set to be considered. This loop of steps 202–210 continues, as shown in FIG. 2A, until each of the text strings in the document set has been assigned a dissimilarity value $D_i$.

In one embodiment, a concordance table or other index may be included in the system. In that embodiment, the concordance table points to selected text strings in the document set such that not all text strings are assigned a dissimilarity value $D_i$. In a preferred embodiment, the concordance tables provide indexed search capabilities, wherein each distinct word in the document set has a single entry in the table, each of which is assigned a value $D_i$, so that the much more numerous instances of those words in the document set do not have to be assigned values directly.

The weight value $w_n$ associated with each rule initially may be some predetermined number. In one embodiment, all rules are given the same initial weight, and in another embodiment each rule is given a weight based on some expected weight. In one embodiment, the weight value $w_n$ is inversely related to some measure of the likelihood that the rule $R_n$ will generate a text match that will be selected by the user. Preferably, the weight value $w_n$ is a penalty value associated with each rule $R_n$.

The weight values $w_n$ may be user-specific or application-specific. For example, if a particular user is known to make typographic substitution errors in entering a search query, the initial weight associated with that rule will reflect that tendency. For another example, in a document set that was obtained using OCR technology and stored in memory, a common mismatch may arise from the substitution of the numeral "1" for the letter "l", and vice versa. The weight values $w_n$ for such a common error initially may be set at some predetermined value based on historical data for the application of the character substitution rule for those OCR situations. In an alternative embodiment of the present invention, different rules may have the same weight value. The weight value also may be adjustable or determinable by the user. The weight associated with each rule is important for displaying the search result, as described in further detail below.

In the preferred system, the weight value $w_n$ is a penalty attributed to each rule. Each penalty may be attributed with an initial value, a range that may be based on the values of the weight of another rule or weights of a plurality of rules, plus various parameters to govern the manner and rate of adaptive change as described in further detail below. As described above, the penalty may be set to the same value for each rule or may be set to different values based on prior experience or projections of the relative importance of each rule.

Once all document text strings are assigned 208 a dissimilarity value $D_i$, the next step 212 is retrieving a text string set. The retrieved document text string set contains location and other information associated with each instance of each of the document text strings.

The system retrieves a text string set in accordance with a second set of rules stored in a memory device, such as device 107 of FIG. 1. These rules may include: retrieve only those text document strings having a dissimilarity value of zero (i.e., exact matches); retrieve all document text strings having the lowest dissimilarity value $D_i$; retrieve the first x number of document text strings having the lowest dissimilarity value $D_i$; retrieve only those document text strings having a dissimilarity value below x; retrieve all document text strings having the j lowest dissimilarity values $D_i$; retrieve one document text string having the lowest dissimilarity value $D_i$ per document; and the like. In one embodiment, the second set of rules may affect the $D_i$ values. Where appropriate, such rules may be applicable to text string instances in whole documents, specific sets of documents, or specific portions of one or more documents, depending on the scope and style of the search process.

For example, each document may have an associated penalty weight that is used to affect the $D_i$ values of all document text strings obtained from that document. The document weights may be fixed, may be determined by certain document data, or may be determined from user selections of retrieved text strings. Document weights may be uniformly applied to all instances of all text strings in that document, or may be made specific to the instances of each distinct document text string. For example, the penalty weight associated with a document may be derived from the number of text string instances in that document with dissimilarity values below x. In another example, the penalty weight associated with a document may be derived from the ratio of text string instances in that document with dissimilarity values below x, as compared to the total amount of text in the document. In cases where there is a penalty associated with each document, there may be another threshold value, y, which the resultant total penalty of each text string must not exceed in order to be retrieved. Document weights may also be based on information contained in an index of system-generated or user-defined codes associated with each document.

In a preferred embodiment, the text string set contains a single entry for each distinct document text string occurring in each document. Multiple occurrences of possibly different text strings within a single document may contribute to the calculation of the document penalty weight for a given text string, but exactly one element is established in the retrieved text string set for each different text string which occurs in that document. The number of occurrences of that text string in the document, as well as the locations of each such instance within the document, and other information, are maintained in association with that single element of the set. As a result, a single text string may have many distinct elements in the retrieved text string set, one element for each document in which the string occurs one or more times. In addition, there may be several distinct text strings, with different spellings, which "match" the text string query to within a desired threshold value, and so have distinct entries in the retrieved text string set for each document in which they occur.

In one embodiment, such penalty values, indices and retrieved text set entries may be associated with sets of documents or portions of one or more documents. In a preferred embodiment, the definition of a "document" is a directed acyclic graph comprised of pages and other documents which do not ultimately contain the defined document. In other embodiments, the smallest unit of inclusion may be a unit other than a page, such as a character, sentence or paragraph. Through this device, the second set of rules may be applied to the document set, based on any desired level of granularity in the retrieved text string set.

In a preferred embodiment, the retrieved text strings then are ordered 214 based on the dissimilarity value $D_i$ associated with each of the text strings in the retrieved text string set. Preferably, the retrieved text string having the lowest dissimilarity value is prioritized over a text string having a higher dissimilarity value. For example, a single retrieved text string may appear in the ordered list several times, if it occurs in different documents, depending on the rule from the second set of rules used to retrieve the text string from the document text strings. In one embodiment, all elements of the retrieved text string set which are for string occurrences within a single document are combined into a single entry for the purposes of display. The combined entry is given a dissimilarity value which is based on the individual dissimilarity values of the entries from which it was created. The manner in which combined metric values are obtained is discussed below. The display then shows all retrieved text strings for each document, sorted in order of the combined dissimilarity values of the documents.

At step 216 the display device 110 displays the ordered retrieved text string set. The generated display typically is for the user to view the retrieved text string prior to retrieving an entire page or a portion of a page of the document set containing the retrieved text string. For example, in a medical records context, a user may wish to retrieve and view the stored medical record of a certain patient "Smith". Before retrieving the entire medical record for each patient named "Smith", and other variations on the name "Smith", the present system displays 216 a list of retrieved text strings located in the search. The display may contain some contextual information about instances of the name "Smith", as is commonly done in existing search systems.

The system waits 218 for the selection of a text string from the display 110. This selection may be made by a user through the input device 104, which may include a keyboard, mouse, or touch screen. In an alternative embodiment, the selection is made automatically based on penalty values to facilitate automated report generation. Such a selection results in instructions being sent to another system that retrieves a portion of the document, which may include several pages, a single page, or a portion of a page, containing the selected text string. An exemplary system that may be used in conjunction with the present system is disclosed in commonly owned U.S. patent application Ser. No. 08/060,429, which is incorporated herein by reference.

In another example, the selected text string may be sent to a processor for interaction with an application program to achieve a spellcheck operation. Specifically, once the user activates a spellcheck program incorporating the present invention, the system identifies a text string in the document being spellchecked and searches through a dictionary, i.e., the document set, to identify a match. The "best" matches are then displayed for a user in the manner substantially as described herein. The present invention may also be used in a variety of other systems, including foreign language lookup, practice, citation, and dictionary systems, and the like.

An important aspect of the present invention is that the weight values $w_n$ may be adaptive in nature. Accordingly, the next step 220 involves adjusting the weight value $w_n$ associated with each rule, or rules, associated with the retrieved text string $TS_k$ selected from the display. For example, in one embodiment, if a user selects one of the displayed text strings $TS_k$, the penalty weight associated with each of the rules that was invoked at steps 204–206 may be decremented or otherwise adjusted. As the system continues to be used, the weight associated with each rule $R_n$ of the selected text string is adjusted a small amount up or down in such a manner that the system adapts to both the user and the application environment. This may be achieved by effectively "rewarding" rules that are successful in finding close matches that ultimately are selected by the user, e.g., by decreasing their associated penalty weights, to achieve a basis for discriminating among the rules based on an adjustment of the weight values.

In a preferred embodiment, the weight values $w_n$ associated with every rule $R_n$ of the rule set are adjusted. In other embodiments, only the weight value $w_n$ associated with the rules $R_n$ used in retrieving the selected text string $TS_k$ are adjusted. In yet another embodiment, the weight values $w_n$ associated with selected ones of the rules $R_n$ are adjusted. The specific manner in which the weight values $w_n$ are adjusted depends on the particular embodiment of the invention. Preferably, the system retains the adjusted weight values in memory so that for each subsequent search the adjusted weight values are applied in accordance with the use of their respective rules. Thus, at the step 208 of assigning a dissimilarity value $D_i$ to each text string in a document set, that value $D_i$ is determined based on the adjusted weight values from previous searches.

The objective of the adjustment of weight values is to arrive at new weights $w_n$ in such a manner as to discriminate between the text matches that the user selects and those which the user does not select. A preferred method, referred to as a perturbation method, determines and uses a measure of correspondence C to adjust the weights $w_n$ of all the rules in the first set of rules. According to the perturbation method, the weights associated with each of the various rules $R_n$ may either be incremented or decremented in such a way as to increase C. The measure of correspondence C determined in practicing the present invention may be expressed as:

$$C = \bar{D}_m - \bar{D}_i \qquad \text{(Eq. 2)}$$

wherein $\bar{D}_m$ is the mean dissimilarity value associated with non-selected text strings m, and $\bar{D}_i$ is the mean dissimilarity value of selected text strings. As described above, each text string in the document set typically has an associated dissimilarity value.

FIG. 3 is a flow chart of a preferred system for performing the perturbation method. As a first step 300 an initial measure of association C is determined, preferably in accordance with the algorithm stated above. This first step typically is taken after the user has made one or more selections from the set of retrieved text strings. In the next step 302 the weight $w_n$ associated with a single rule $R_n$ is decremented by a predetermined value. The value may be a constant, such as 1, or may be any selected number. The method of performing the decrement may be by subtraction, division, or other mathematical methods known and available to those skilled in the art. All other weights remain unchanged for purposes of performing this method. An adjusted measure of association C' is determined 304 using the decremented weight value $w_n'$. In the preferred embodiment, this determination 304 is made in accordance with the algorithm defined above.

In the next step 306 the system checks whether the adjusted measure of association C' determined in step 304 has increased over the initial measure of association C determined in step 300 prior to the decrementing step 302. If C' is increased over C, then the weight value $w_n'$ remains 308 the decremented value. However, if C' is not increased over C, then the weight value $w_n'$ is returned to its original value $w_n$, and then $w_n$ is incremented 310 by some predetermined value. The steps of 300 through 310 may be performed individually for the weight associated with each rule in the present system. The method of performing the increment may be by addition, multiplication, or other mathematical methods known and available to those skilled in the art.

Optionally, the measure of association C may be recalculated after step 310 or otherwise checked against C to verify an improvement. The illustrated system of FIG. 3 may alternatively be performed by initially incrementing the weight value $w_n$, by checking for a decrease in C rather than an increase in C, or both. The perturbation method is performed to increase the measure of correspondence. In practicing the invention including performing perturbation on the weights and rules, the system strives for separation between the dissimilarity value $D_i$ of selected text strings and the non-selected text strings. Other methods of determining C may be used.

The system may further include some selection preference value $s_q$ associated with each text string. The selection preference value $s_q$ may be a binary number designating whether or not a particular text string TS has been selected. In a preferred embodiment, the selection preference variable $s_q$ is assigned a value of 0 if the match is selected by the user, and 1 if it is not selected by the user. Alternatively, the user may prioritize the retrieved text strings, assigning numeric values (not restricted to 0 or 1) to indicate preferences among the close matches. In that embodiment, a lower numeric value indicates a greater interest in a particular close match (e.g., 1 indicates first choice, 2 indicates second choice, etc.)

In alternative embodiments, an appropriate measure of correspondence C may be determined in any of several ways as: the Pearson product moment coefficient of correlation between the dissimilarity values $D_i$ and the selection preferences $s_q$; the reciprocal of the probability of the Pearson product moment coefficient of correlation computed under the null hypothesis that there is no correlation between the distances and the selection preferences; negative one multiplied by the probability of the Pearson product moment coefficient of correlation computed under the null hypothesis that there is no correlation between the distances and the selection preferences; the Spearman rho rank-order coefficient of correlation between the dissimilarity values $D_i$ and the selection preferences $s_q$; or, the reciprocal of the probability of the Spearman rho rank-order coefficient of correlation computed under the null hypothesis that there is no correlation between the dissimilarity value $D_i$ and the selection preferences $s_q$.

In one embodiment, after the weights $w_n$ have been restored and incremented at step 310 or decremented at step 308, the weights $w_n$ may be normalized. Normalization may be carried out to prevent the values of the weights from becoming too large or too small for precise calculation, and to ensure that dissimilarity values $D_i$ determined after separate queries have comparable values.

Normalization may be applied to the entire set of weights, or to subsets of weights corresponding to categories of related rules $R_n$. For example, weights associated with the substitution of typographically similar characters might constitute a subset of weights normalized separately from other weights.

Normalization may include one or more of the following steps: adding a quantity to the weight $w_n$ associated with each rule in a set to achieve a fixed mean or other measure of central tendency; multiplying the weight $w_n$ associated with each rule in a set by a quantity to achieve a fixed mean or other measure of central tendency, or to achieve a fixed standard deviation or other measure of dispersion; adding a quantity to the weight $w_n$ associated with each rule in a set in order to maintain a particular weight in the set at a fixed value; or multiplying the weight $w_n$ associated with each rule in a set by a quantity in order to maintain a particular weight at a fixed value.

Figure 4:
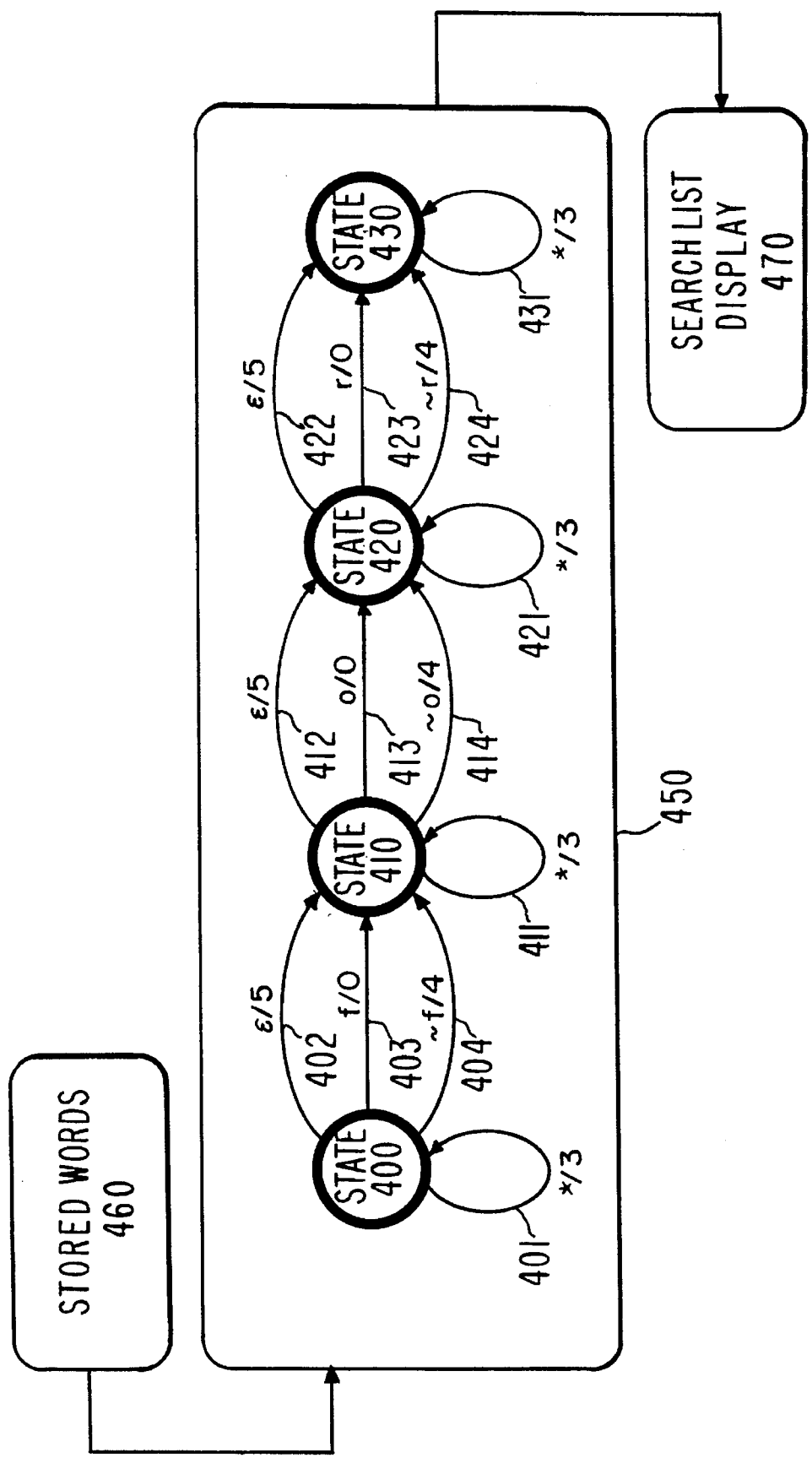
FIG. 4 shows a state diagram of a finite non-deterministic automaton in accordance with the present invention.

Referring now to FIG. 4, there is shown a state diagram depiction of a finite non-deterministic automaton 450 in accordance with the present invention. Automaton 450 is implemented in a preferred embodiment by a computer program stored in memory, e.g., 106, and controlling the operation of CPU 102. The particular automaton 450 illustrated in FIG. 4 is designed specifically for the retrieval of a certain English word, i.e., "for", but it should be apparent that state machines for retrieval of other words or phrases, or for other types of symbols, may readily be constructed either manually or automatically. A database of stored words 460, such as may be found in document storage medium 108 of FIG. 1, are applied to automaton 450. The results of processing by automaton 450 are applied to search list display 470, which produces a visible or other indication of which of stored words 460 most closely resemble the search term for which automaton 450 was constructed. In one embodiment, search list display 470 is implemented in a conventional manner by programming CPU 102 of FIG. 1.

Figure 5:
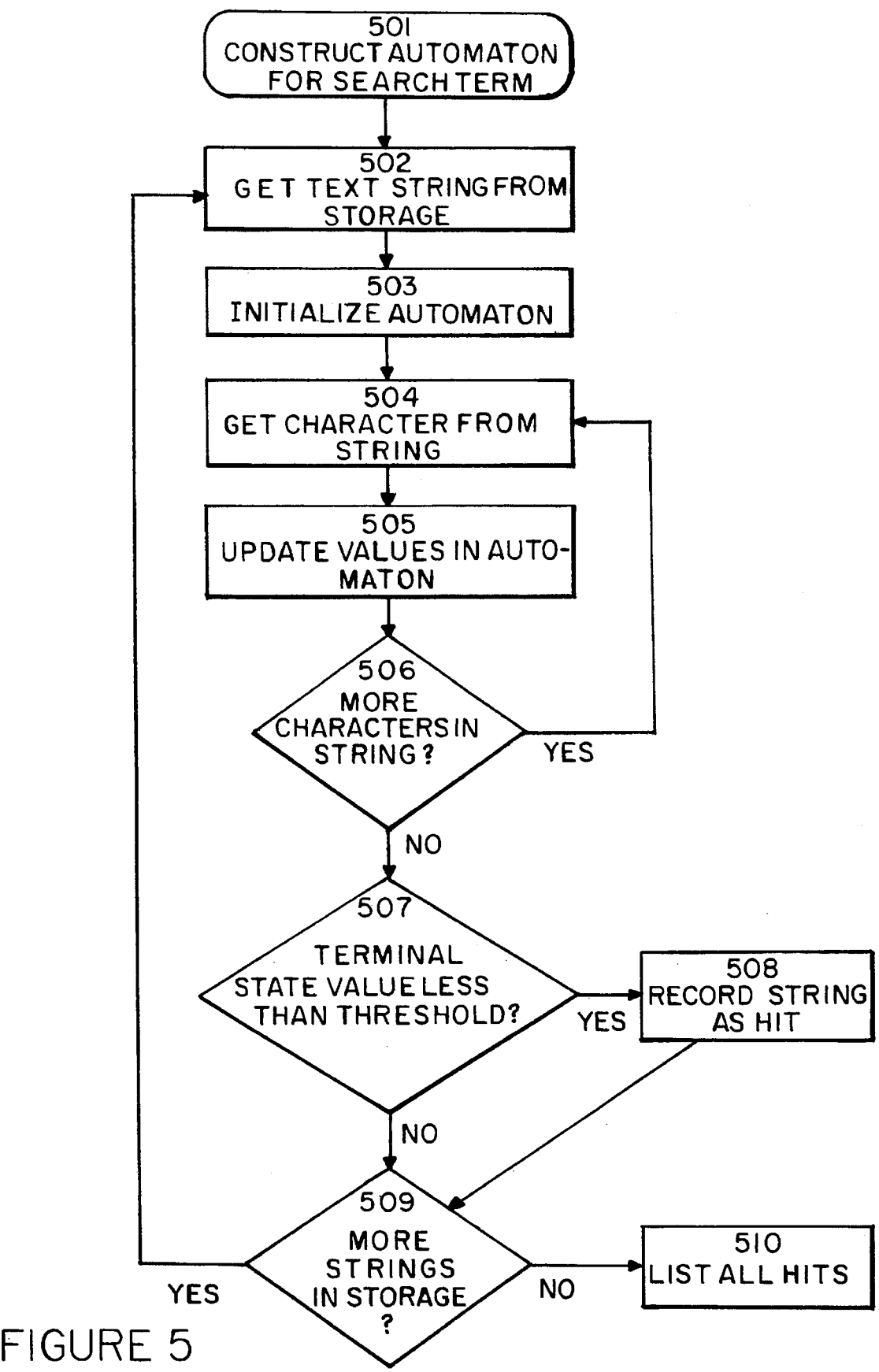
FIG. 5 depicts a flow chart of processing using an automaton in accordance with the present invention.

Referring now also to FIG. 5, there is shown a flow diagram of processing by an automaton, e.g., 450, a database of stored words 460, and apparatus for search list display 470. First, an automaton such as 450 is constructed 501 for a desired search term or expression. It is apparent from the description below how such an automaton 450 may be implemented. Next, a text string is obtained 502 from storage. The automaton is then initialized 503 by assigning predetermined values to states of the automaton, as described in detail below. A character from the string is then obtained 504, and values of the states of the automaton are updated 505 in response to that character, as is also described in detail below. A check 506 is then made to determine whether there are more characters left in the current character string. If so, processing returns to 504 to obtain another character. Otherwise, a check 507 is made to determine whether a value of a terminal state of the automaton is less than a predetermined threshold value, as described in greater detail below. If so, the current string is recorded 508 as a hit. In any event, a check 509 is then made to determine whether there are more strings in storage left to examine. If so, processing returns to 502 to obtain another string. If there are no additional strings to examine, the hits are listed 510 for the user.

Generally speaking, finite automata include three types of states: initial states, intermediate states, and terminal states. Each state may be set either to an "on" status or an "off" status, with the state or states turned on at the beginning of processing being termed "initial states." The transition of an automaton from one state to another depends on the identity of successive symbols from an input symbol set. For non-deterministic automata, more than one state may be current (i.e., set to "on") at any particular time.

Transition from one state to another is determined by a set of transition rules that specify the circumstances for changing the status of particular states. As each incoming character is processed, each of the rules is examined to determine which states are to be marked to be set "on". After this examination, each state marked to be set on is set on, and all other states are set to off. If at any time there are no states in the "on" status, the process is considered to have failed to identify any candidate matches.

A set of the states of such an automaton is designated as a "terminal" set of states, i.e., states that, if reached, indicate that the incoming characters already processed match a pattern that the automaton has been constructed to detect. If a terminal state is found to be set to "on" after the last incoming signal has been processed, the sequence of incoming symbols is deemed to constitute a pattern match for the pattern associated with the terminal state. Intermediate states are those which are neither initial states nor terminal states.

Turning now to automaton 450, this automaton is a non-deterministic fuzzy (or "extended" or "generalized") automaton and does not include states that are set to be only either "on" or "off". Each state of automaton 450 is associated with a metric to indicate its status. In a preferred embodiment, metrics are positive integers that range from 0 (the "on-most" status) to infinity (the "off-most" status). It should be recognized that other systems of metrics could be used as well.

In the notation of FIG. 4, a transition rule, e.g., 403, provides a transition from a first state, e.g., 400, to a second state, e.g., 410, if the character presently under examination is a specified character, e.g., "f", resulting in an additional penalty as specified, e.g., 0, to be accrued by the second state upon such transition. Thus, a transition from state 400 to state 410 at a time when the current character is "f" would result in no additional penalty under rule 403. The "~f" notation for rule 404 means that rule 404 is applicable for any character other than "f". The "$\epsilon$" notation for rule 402 means that rule 402 is applicable without any new character input; such rules are applied (1) before the first incoming character has been processed, and (2) following the application of all other rules after an incoming character has been processed (or, equivalently, between the processing of characters). The "*" notation for rule 401 means that rule 401 is applicable for any character, as rule 401 indicates a transition from state 400 back to state 400. The numerals after the diagonal slashes in rules 401–404, as well as in rules 411–414 and 421–424, indicate the magnitudes of the penalties to be accrued for each corresponding transition. Such penalties are added on to augment the metric associated with the state to which the transition is made. For example, rule 401 specifies that transition from state 400 to state 400 upon the occurrence of any character increases the metric of state 400 by a penalty of 3. Similarly, rule 404 specifies that transition from state 400 to state 410 upon the occurrence of any character other than "f" increases the metric of state 410 by a penalty of 4.

The states of a fuzzy non-deterministic finite-state automaton are assigned a sequential order, such that there are no transitions from a later state to an earlier state except for transitions back to the initial state triggered by processing of a hyphen or ambiguous space, as discussed below.

The automaton is initialized 503 in several steps. First, a value of 0 is assigned to each initial state (i.e., state 400). Rules for transition without character input (i.e., rules 402, 412, and 422) are then used to assign, in sequential order, values to non-initial states. In this example, rules 402, 412, and 422 are used to assign values 5, 10, and 15 sequentially to states 410, 420, and 430, to deal with the possibility that one or more initial characters may be missing from the incoming character stream.

In operation, states are evaluated immediately before and immediately after examination of an input character. Examination before a character arrives is performed to mark states with values equal to current values plus values associated with the incoming stream containing an extra, unanticipated character. Rules 401, 411, 421, and 431 would be invoked in such a case and would result in the addition of 3 to the values of states 400, 410, 420 and 430, respectively.

As an incoming character is processed, each state is processed in its sequential order, and for the state, each rule is examined to determine which rules provided a transition to another state, which may then be remarked. Any rule that would result in a state having a lower marking than its current marking results in the state being given the new, lower marking. For example, if state 400 has been marked with value 0, state 410 has been marked with value 5, and an incoming character "f" is processed, state 410 can then be remarked with value 0+0. Alternatively, if state 400 has been marked with value 0, state 410 has been marked with value 5, and an incoming character "g" is processed, state 410 can then be remarked with value 4. Rules 403, 413, 423, 404, 414, and 424 are used for this purpose in the example.

After an incoming character has been processed, the rules are examined again to determine, for each possible state transition (e.g., state 410 to state 420), whether the value for a target state (e.g., state 420) may be reduced by making it equal to the value of the source state (e.g., state 410) plus any penalty for a transition which results from characters missing in the incoming stream (rules 402, 412, and 422).

After an incoming character has been processed, the value associated with each state is a measure of the extent to which the initial sequence of incoming characters up to, and including, the most recently input character provides a good match with an initial portion of the pattern or patterns the automaton is designed to detect. If at any time during processing there are no states with a sufficiently low value, processing may terminate for that input string because no sufficiently close match could be identified through further processing. This is a direct consequence of using non-negative penalty values.

If there is branching, each branch may have its own terminal state or states. If a state machine is built to identify multiple patterns simultaneously, there may be terminal states associated with each of the various patterns.

If, after the entire input symbol sequence has been processed, some terminal state is found to have an associated zero value (or some other "best match" value), the sequence of incoming symbols that has been read is deemed to constitute a perfect pattern match for the pattern associated with the terminal state. Otherwise, the value associated with a terminal state indicates the degree of dissimilarity between the pattern associated with the terminal state and the incoming sequence, and is therefore used as a dissimilarity value $D_i$ as described above.

Thus, by constructing automata such as automaton 450 for text strings that are desired to be found in a document, each text string stored in document storage medium 108 may be processed by automaton 450, and if upon completion of processing for each such document text string the value associated with a terminal state is less than a given threshold dissimilarity value, such document text strings are considered as "hits". Therefore, in this application the automaton, e.g., 450, is used as a concordance system to locate concordance between stored text strings and desired text strings.

In accordance with the present invention, the values associated with each state of a fuzzy non-deterministic state machine need not be restricted to non-negative numbers; the elements of an ordered Abelian semigroup or finite crossproduct of ordered Abelian semigroups may be used to measure dissimilarity between a search term and a target symbol sequence. Thus, there is no need for a numeric metric, and other metrics that can be used to construct a hierarchy of dissimilarity may be used as well. As an example, vectors consisting of finite sequences of elements of the Abelian semigroup may be used to determine relative dissimilarity between an incoming character string and a desired pattern.

In such case, a user could perform a sensitivity analysis on the penalties related with particular transition rules to better suit the results obtained with those desired by the user. Specifically, the value associated with each state of the automaton may consist of a vector of non-negative numbers, each computed using different sets of penalties for the rules. The dissimilarity values $D_i$ associated with different sets of penalties may then be examined to evaluate the appropriateness of various sets of penalty values. If two penalty sets differ in penalty values assigned to only one of the rules, the difference in similarity values provides an indication of the sensitivity of the similarity values to the particular rule. Such a sensitivity analysis may be used to adaptively modify penalties in order to calculate penalties in such a way that dissimilarity values correspond to a user's rating of similarity between a search term and a target.

Construction of an automaton relies on the use of a "regular expression" used to specify a pattern to be matched. Regular expressions are extensively used in certain branches of computer science, such as pattern matching and compiler construction. Specifically, finite state deterministic automata and finite state non-deterministic automata are used to identify patterns in the processing of character streams. For example, the reference INTRODUCTION TO COMPILER CONSTRUCTION by Thomas W. Parsons, Computer Science Press, 1992 (sections 2.6 "Regular Expressions", 2.7 "Regular Expressions and Finite-State Machines", and other sections) explains and defines "regular expression", finite-state deterministic automaton, and finite-state non-deterministic automaton. An expression is considered to be a "regular expression" for present purposes where: (i) zero, one, or more symbols or sequences of symbols are available to form such expressions; (ii) a "wild card" may be used to represent any of the possible symbols, or some specific subset of the possible symbols, such as numeric characters, a vowel, a numeral, a capital letter; (iii) a symbol or sequence of symbols may be present once or repeated more than once; (iv) a symbol or sequence of symbols may be absent; or (v) a symbol or sequence of symbols may be absent, present once, or repeated more than once.

The fuzzy non-deterministic finite-state automata described herein are distinct from other non-deterministic finite state automata in that each state of the automaton has a value, possibly different from just 0 or 1, associated with it. The value associated with a state changes as characters from an incoming stream are processed. In a fuzzy non-deterministic finite automaton, the value associated with a terminal state indicates how closely the incoming stream of characters that have been processed match the regular expression.

It should be recognized that fuzzy finite non-deterministic automata may be used not only to detect character strings, but similar symbol-examination may be used in other applications, for instance to detect tokens in a computer program, input from a measuring device such as a digital sphygmomanometer, or information from any other monitoring device.

Referring now again to FIG. 4, automaton 450 in effect evaluates changes that would have to be made in a word currently under observation to transform it into the search expression. Each such change carries with it an associated "penalty" or "weight." Automaton 450 finds the minimum penalty required to complete the transformation of the target word into the search expression. The basic rules employed by automaton 450 are as follows: (i) Assess no penalty points where a character of the target word remains unchanged. (ii) Assess four penalty points where a character in the target word must be modified. (iii) Assess five penalty points where an extra character must be added to the target word. (iv) Assess three penalty points where a character of the target word must be deleted. Rule (i) above is implemented by rules 403, 413, 423. Rule (ii) above is implemented by rules 404, 414, 424. Rule (iii) above is implemented by rules 402, 412, 422. Rule (iv) above is implemented by rules 401, 411, 421, 431.

As an example, suppose the input stream "are" is applied to automaton 450. If $S_j$ represents an initial segment of the search expression of j initial characters, i.e., $S_0$="", $S_1$="f", $S_2$="fo", $S_3$="for", if n is an integer equal to one less than the number of states in the automaton, if $T_i$ represents the initial segment of the target expression of i initial characters, i.e., $T_0$="", $T_1$="a", $T_2$="ar", $T_3$="are", and if m represents the length of the entire target expression (also 3 in this case), then the automaton 450 performs the following steps to determine the relative distance metric between "for" and "are":

1. Initialize the fuzzy automaton. For each value of j from 0 to n compute the distance $D_{0,j}$ from $T_0$ to $S_j$ (using rules 402, 412, 422). The distance $D_{0,0}$ from $T_0$ to $S_0$ is 0 (zero), since the $T_0$ and $S_0$ are identical, i.e., they are both empty character strings. Next, the distance $D_{0,1}$ from $T_0$ to $S_1$ is 5 since the character "f" would have to be added to the empty string $T_0$ in order to transform it to the $S_1$, the first character of the search expression. Similarly, $D_{0,2}$ turns out to be 10 since two characters "fo" would have to be added to the input string to transform it to $S_2$, and $D_{0,3}$ turns out to be 15 since three characters "for" would have to be added to the empty input string in order to transform it to $S_3$.

2. Process each of the incoming characters. For each value of i from 1 to m, loop as follows:

2a. This step is carried out just before the ith incoming character is read. Compute the preliminary distances $E_{i,j}$ between $T_i$ and $S_j$ (using rules 401, 411, 421, and 431) as $D_{i,j}+3$ for each value of j from 0 to m. These values turn out to be 3, 8, 13, and 18 when j=0.

2b. This step is carried out just after the ith character has been read. For each value of j from 1 to n, loop as follows:

(i). If the ith character of the target word exactly matches the jth character of the search expression, determine the value of TEMP1 as $D_{i-1,j-1}$ (using rules 403, 413, 423); otherwise, determine the value of TEMP1 as $D_{i-1,j-1}+4$ (using rules 404, 414, 424).

(ii). Set $D_{i,j}$ to be the minimum of $E_{i,j}$ and TEMP1.

2c. Set $D_{i,0}=E_{i,0}$.

2d. For each value of j from 1 to n, if $D_{i,j}$ is less than $D_{i,j-1}+5$, replace $D_{i,j}$ with $D_{i,j-1}+5$ (using rules 402, 412, and 422).

Stepping through the entire procedure described above for automaton 450, assuming an input string "are", and using the shorthand notation $d(T_i,S_j)$ for $D_{i,j}$ or the distance between $T_i$ and $S_j$, and $e(T_i,S_j)$ for $E_{i,j}$, the following is determined:

1. Using rules 402, 412, and 422, determine that d("", "")=0, d("","f")=5, d("","fo")=10, d("","for")=15. An empty target string can be transformed into another empty string with 0 penalty, into "f" by adding one extra character with a penalty of 5, into "fo" by adding two extra characters with a penalty of 10, or into "for" by adding three extra characters with a penalty of 15.

2a. (first outer loop). Using rule 401, determine that e("a","")=3, e("a","f")=8, e("a","fo")=13, and e("a","for")=18. Set d("a","") =3. These results are reasonable because the target string "a" can be transformed into an empty string by deleting one character (rule 401, penalty=3), into "f" by deleting one character (rule 401, penalty=3) and adding another character (rule 402, penalty=5) for a total penalty of 8, into "fo" by deleting one character (rule 401, penalty=3) and adding two others (rules 402 and 412, each with penalty=5) for a total penalty of 13, or into "for" by deleting one character (rule 401, penalty=3) and adding three others (rules 402, 412, and 422, each with penalty=5) for a total penalty of 18.

2b. (first outer loop) (first inner loop). Letting i=1 and j=1, we already know from the preceding paragraph that e("a", "f")=8. We can also determine that TEMP1=0+4=4 because we can change the "a" into an "f", regarding the change as a substitution of a mismatched character, with a penalty of 4 (rule 403, penalty =4). Set $D_{1,1}$ to be 4 (the minimum of the quantities $E_{1,1}$=8 and TEMP1=4). Thus d("a","f")=4.

2b. (first outer loop) (second inner loop). Letting i=1 and j=2, we already know that $E_{1,2}$=13. We can also determine the TEMP1=5+4=9 because we can transform "a" into "fo" by adding an "f" (rule 402, penalty=5) and then changing the "a" to an "o" (rule 413, penalty=5). Set $D_{1,2}$ to be 9 (the minimum of the quantities $E_{1,2}$=13 and TEMP1=9). Thus d("a","fo")=9.

2b. (first outer loop)(third inner loop). Letting i=1 and j=3, determine that $E_{1,3}$=18, TEMP1=d("","fo")+4=10+4=14. This result is intuitively satisfying, since d("a","fo") was determined to be 9, and "for" is simply "fo" with an extra character added to the end.

2c. (first outer loop). Set d("a","")=e("a","")=3.

2d. (first outer loop). We now have d("a","")=3, d("a","f")=4, d("a","fo")=8, and d("a","for")=9. In this sequence of values (3, 4, 8, and 9), no values exceeds its predecessor by more than 5, so no changes are required.

2a. (second outer loop). Compute the preliminary distances $E_{2,j}$ between $T_2$ and $S_j$ (using rules 401, 411, 421, and 431) as $D_{2,j}$+3 for each value of j from 0 to m. These values turn out to be 6, 7, 12, and 17. Using rule 401, determine that e("ar","")=d("a","")+3=3+3=6. Next find e("ar","f")=d("a","f")+3=4+3=7. Similarly, e("ar","fo")=d("a","fo")+3=9+3=12. Also, e("ar","for")=d("a", "for")=14+3=17.

2b. (second outer loop) (first inner loop). Letting i=2 and j=1, we know that that $E_{2,1}$=7. Also, TEMP1=d("a","")+4=3+4=7. Thus, d("ar","f")=7.

2b. (second outer loop) (second inner loop). Letting i=2 and j=2, we know that $E_{2,2}$=12. Also, TEMP1=d("a","f")+4=4+4=8. Then d("ar","fo") is the minimum of the quantifies $E_{2,2}$=12 and TEMP1=8. Thus, d("ar","fo")=8. This is reasonable because the characters "ar" may be changed to "fo" by changing "a" to "f" (rule 403, penalty=4) and changing "r" to "o" (rule 413, penalty=4).

2b. (second outer loop) (third inner loop). Letting i=2 and j=3, we know that $E_{2,3}$=17. Since "ar" and "for" have the same last character, TEMP1=d("a","fo")+0=9+0=9. Then d("ar","for") is the minimum of the quantities $E_{2,3}$=17 and TEMP1=9, and so d("ar","for")=9.

2c. (second outer loop). Set d("ar","")=e("ar","")=6.

2d. (second outer loop). We now have d("ar","")=6, d("ar","")=7, d("ar","fo")=8, and d("ar","for")=9. In this sequence of values (6, 7, 8, and 9), no value exceeds its predecessor by more than 5, so no changes are required.

2a. (third outer loop). Compute the preliminary distances $E_{3,j}$ between $T_3$ and $S_j$ (using rules 401, 411, 421, and 431) as $D_{3,j}$+3 for each value of j from 0 to m. These values turn out to be 9, 10, 11, and 12. Using rule 401, determine that d("are","")=9. Next find e("are","f")=d("ar","f")+3=7+3=10. Similarly, e("are","fo")=d("ar","fo")+3=8+3=11. Also, e("are","for")=d("ar", "for")=9+3=12.

2b. (third outer loop) (first inner loop). Letting i=3 and j=1, we know that $E_{3,1}$=10. Also, TEMP1=d("ar","")+4=6+4=10, so that d("are","f")=10.

2b. (third outer loop) (second inner loop). Letting i=3 and j=2, we know that $E_{3,2}$=11. Also, TEMP1=d("ar","f")+4=7+4=11, so that, so that d("are","fo")=11.

2b. (third outer loop) (third inner loop). Letting i=3 and j=3, we know that $E_{3,3}$=12. Also, TEMP1=d("ar","fo")+4= 8+4=12, so that d("are","for")=12.

2c. (third outer loop). Set d("are","")=e("are","")=9.

2d. (third outer loop). We now have d("are","")=9, d("are","f")=10, d("are","fo")=11, and d("are","for")=12. In this sequence of values (9, 10, 11, and 12), no value exceeds its predecessor by more than 5, so no changes are required.

This result is reasonable since the character string "are" may be changed to "for" by changing "a" to "f" (rule 404, penalty=4), adding an "o" (rule 411, penalty=3), keeping the "r" (no penalty), and deleting the "e" (rule 431, penalty=5). Alternatively, the character string "are" may be changed to "for" by changing "a" to "f", (rule 404, penalty=4), changing "r" to "o" (rule 414, penalty=4), and changing "e" to "r" (rule 424, penalty=4).

Thus the distance between "are" and "for" is determined to be 12. It is not possible to transform "are" into "for" with a penalty lower than 12.

From the above, it should be recognized that search expressions more complex than a single word or providing for "wildcards", optional symbols, repeated symbols, or sets of allowed symbols or strings of symbols will result in automata that are more complex. Such automata may include branches that may or may not reunite, may contain loops, and may contain other kinds of transitions. It should also be recognized that provision for "fuzzy" characteristics, such as modified, extra or missing characters; exchanged adjacent characters; phonetic replacements; optical character recognition errors (e.g., "m" for "rn"); capitalization; grammatical errors; and affixes may all be handled by including appropriate transitions in an automaton. Similarly, ambiguity as to spaces between characters or words, hyphens, and characters marked as indecipherable or ambiguous by optical character recognition apparatus may be appropriately handled by corresponding transition rules. It should also be apparent that not only body text from documents, but text abstracting or describing documents, document titles, and other text is searchable in the manner described herein.

In one embodiment, when used with an OCR system that can provide confidence levels for recognition of particular symbols, each symbol may have associated with it a confidence factor and possible alternate symbols, and penalty values can be adapted from this information.

Some further examples illustrating the flexibility of operation provided by various embodiments are discussed below.

Figure 6:
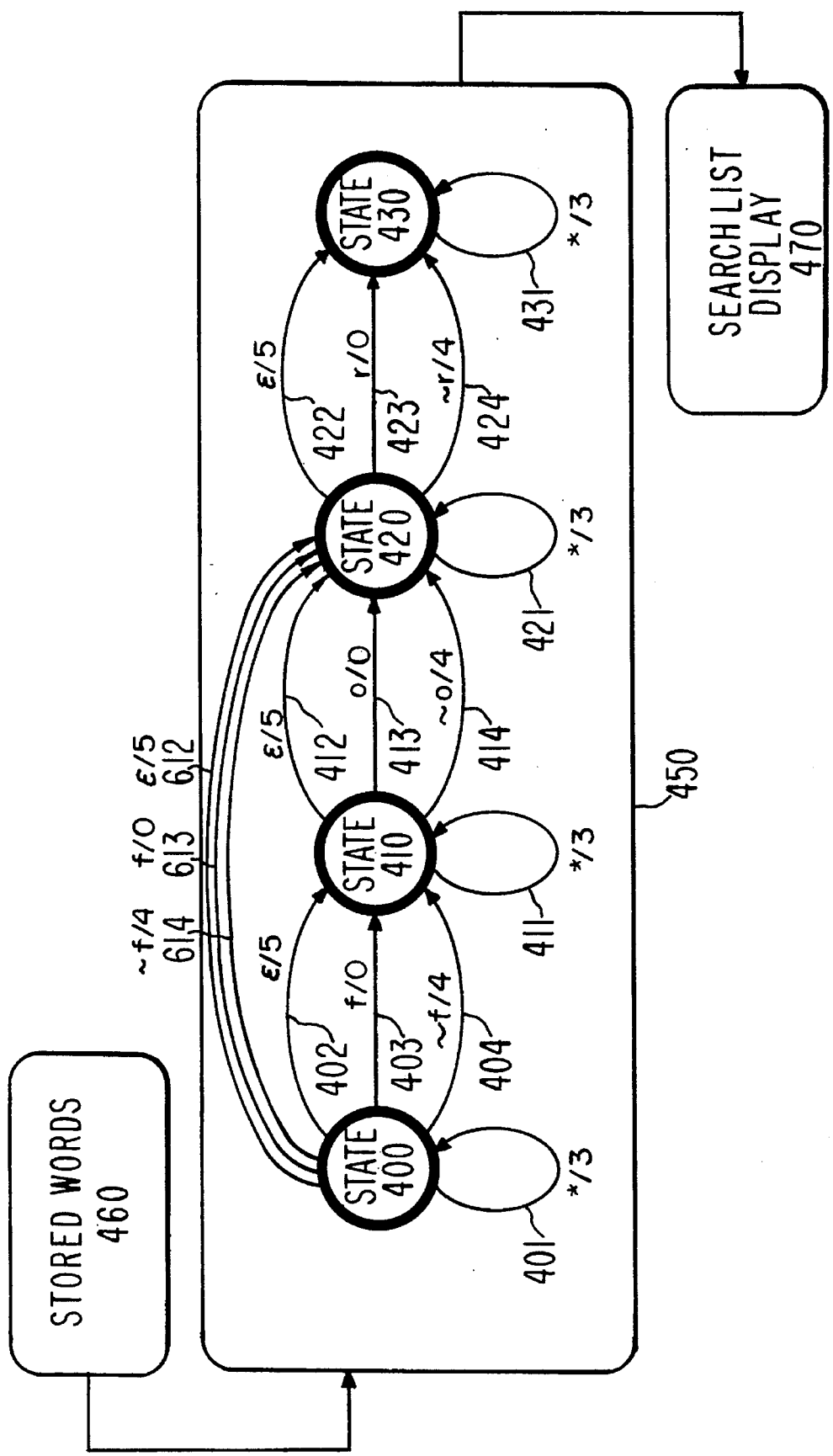
FIG. 6 shows a state diagram of a finite non-deterministic automaton featuring processing of optional characters, in accordance with the present invention.

Optional characters. Fuzzy non-deterministic finite-state automata are able to perform searches for patterns in which portions of the pattern are optional. FIG. 6 illustrates a fuzzy non-deterministic finite-state automaton for detecting the word "for", but the letter "o" is treated as optional, so that both "for" and "fr" are determined by the automaton to be perfect matches. FIG. 6 is identical to FIG. 4 except that it contains three additional transition rules 612, 613, and 614. These transition rules are identical to transition rules 402, 403, and 404, except that they provide for transitions from state 400 to state 420 instead of from state 400 to state 410. The effect of these transition rules is to permit any transition capable of going from state 400 to state 410 to go instead to state 420, bypassing state 410. Since 410 is the state from which the letter "o" provides a penalty-free transition, the new rules 612, 613, and 614 permit the letter "o" to be optionally deleted without penalty.

Figure 7:
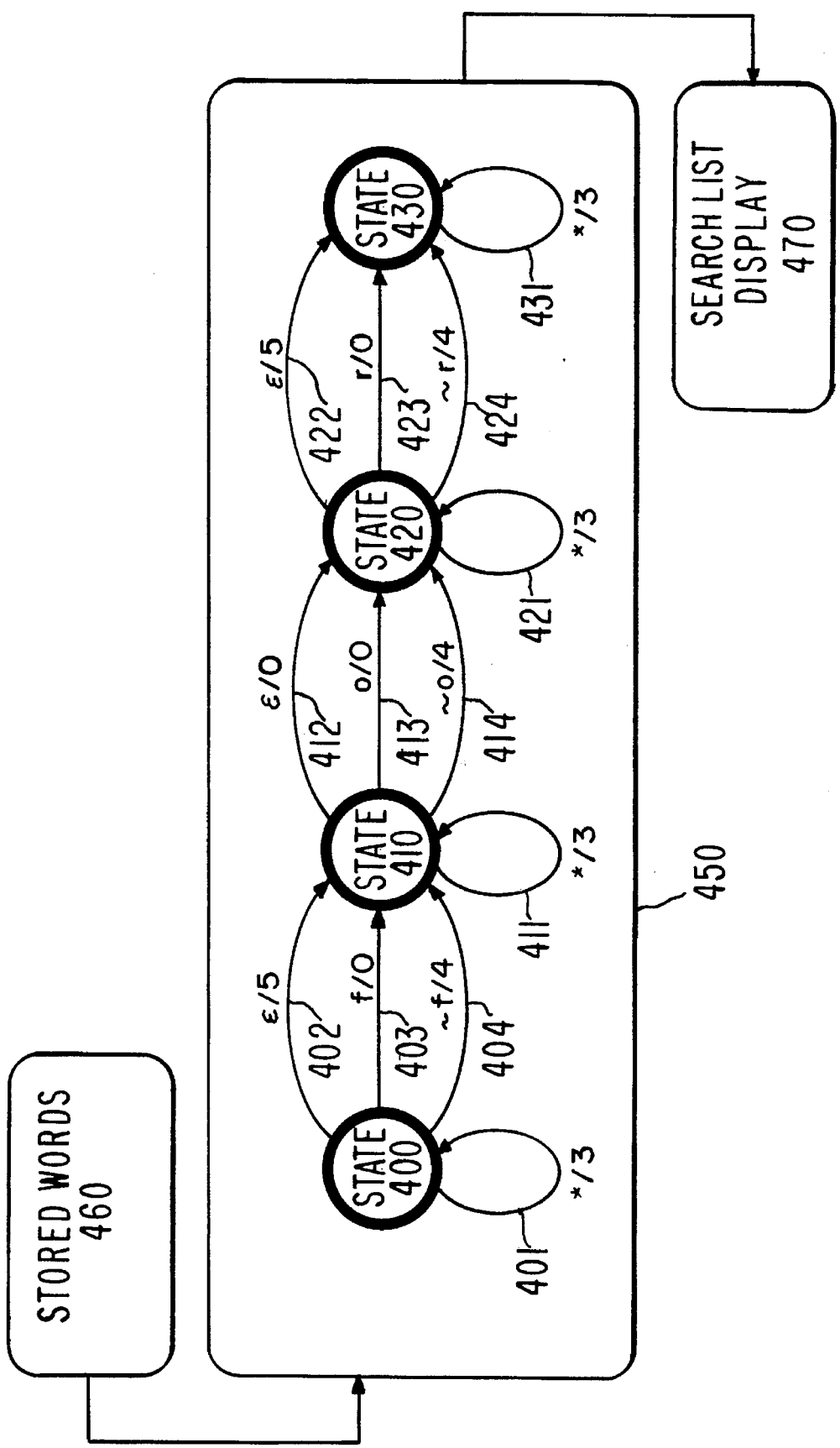
FIG. 7 shows a state diagram of another finite non-deterministic automaton featuring processing of optional characters, in accordance with the present invention.

FIG. 7 illustrates another fuzzy non-deterministic finite-state automaton that produces dissimilarity measurements the same as those produced by the automaton in FIG. 6. FIG.

7 is identical to FIG. 4, except that transition rule 412 has zero penalty, permitting transition from state 410 to state 420 without penalty. The automaton illustrated in FIG. 7 is simpler than the automaton in FIG. 6, but does not provide a direct transition from state 410 to state 420.

Figure 8:
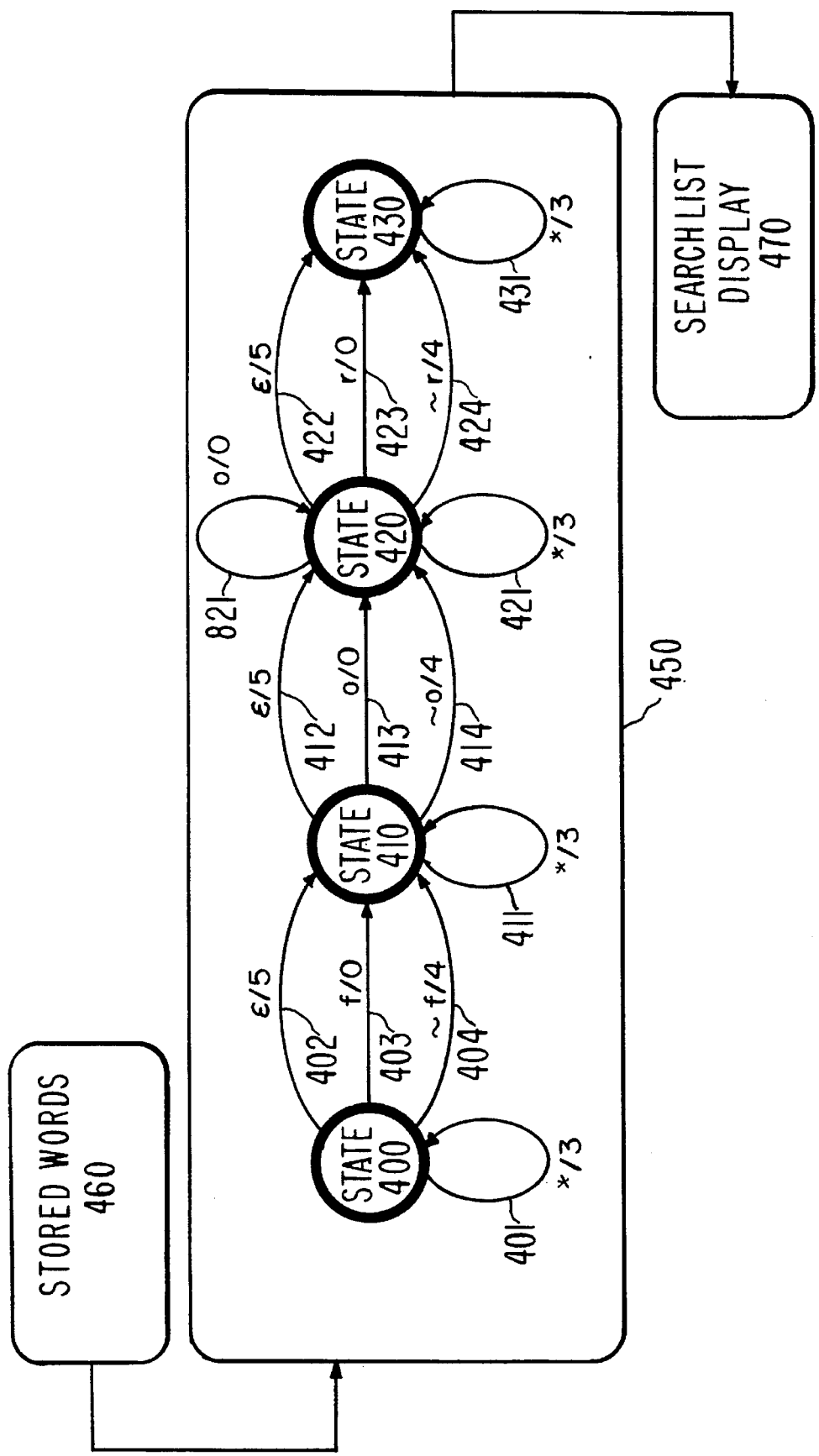
FIG. 8 shows a state diagram of a finite non-deterministic automaton featuring processing of repeatable characters, in accordance with the present invention.

Repeated characters. Fuzzy non-deterministic finite-state automata are able to perform searches for patterns in which portions of the pattern are permitted to be repeated. FIG. 8 illustrates a fuzzy non-deterministic finite-state automaton for detecting the word "for", but the letter "o" is treated as repeatable, so that "for", "foor", "fooor", "foooor", etc. are determined by the automaton to be perfect matches. FIG. 8 is identical to FIG. 4 except that it contains one additional transition rule 821 permitting the automaton to remain in state 420 without penalty when the letter "o" is processed in the incoming stream.

Figure 9:
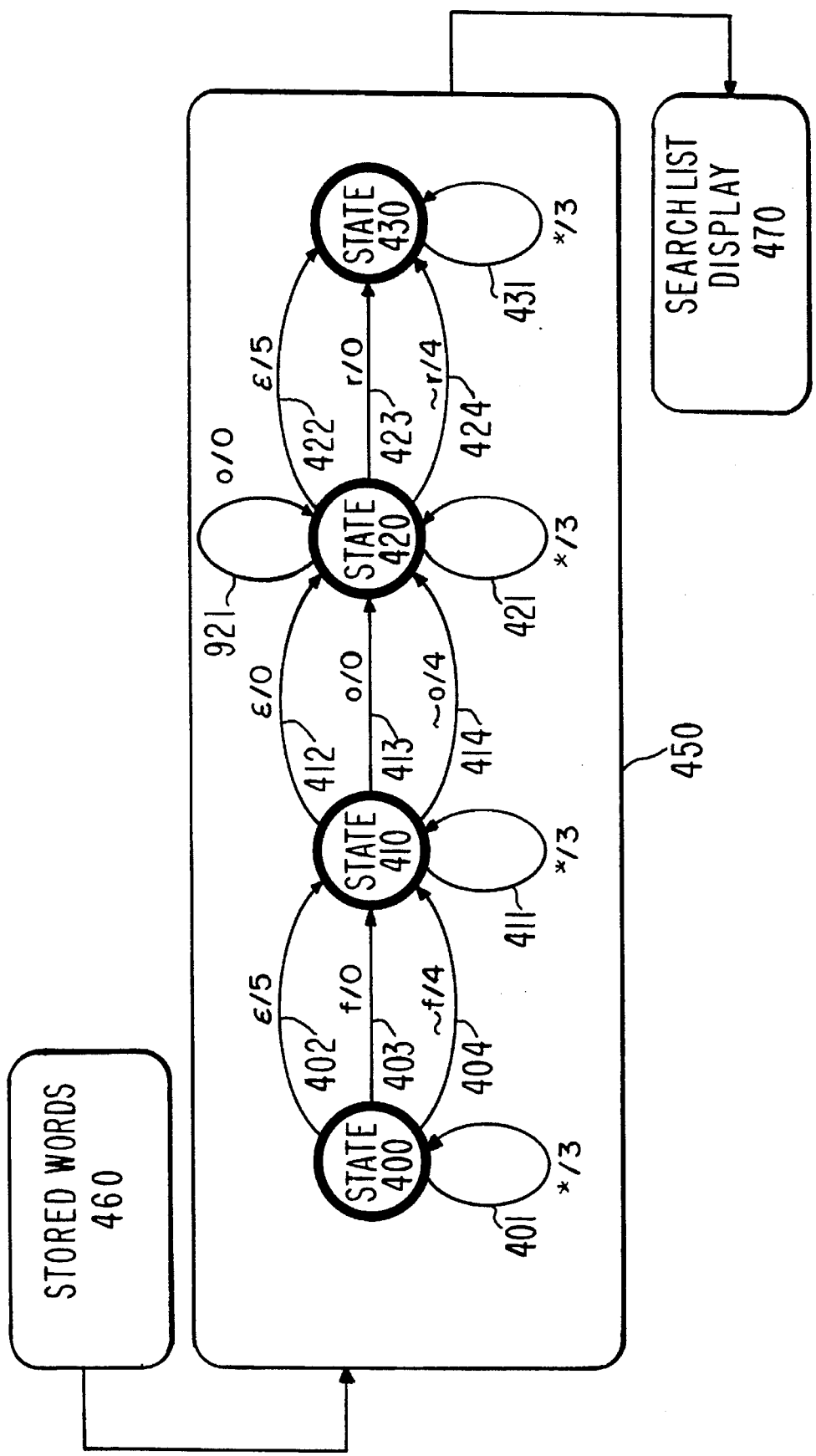
FIG. 9 shows a state diagram of a finite non-deterministic automaton featuring processing of repeatable and optional characters, in accordance with the present invention.

Optional repeated characters. Fuzzy non-deterministic finite-state automata are able to perform searches for patterns in which portions of the pattern are permitted to be either optional or repeated. FIG. 9 illustrates a fuzzy non-deterministic finite-state automaton for detecting the word "for", but the letter "o" is treated as both optional and repeatable so that "fr", "for", "foor", "fooor", "foooor" are all determined by the automaton to be perfect matches. FIG. 9 is identical to FIG. 4 except that rule 412 permitting a transition from state 410 to 420 has zero penalty, and there is an additional rule 921 permitting the automaton to remain in state 420 when a letter "o" is processed. Rule 412 permits the letter "o" to be omitted, and rule 921 permits the "o" to be repeated.

Figure 10:
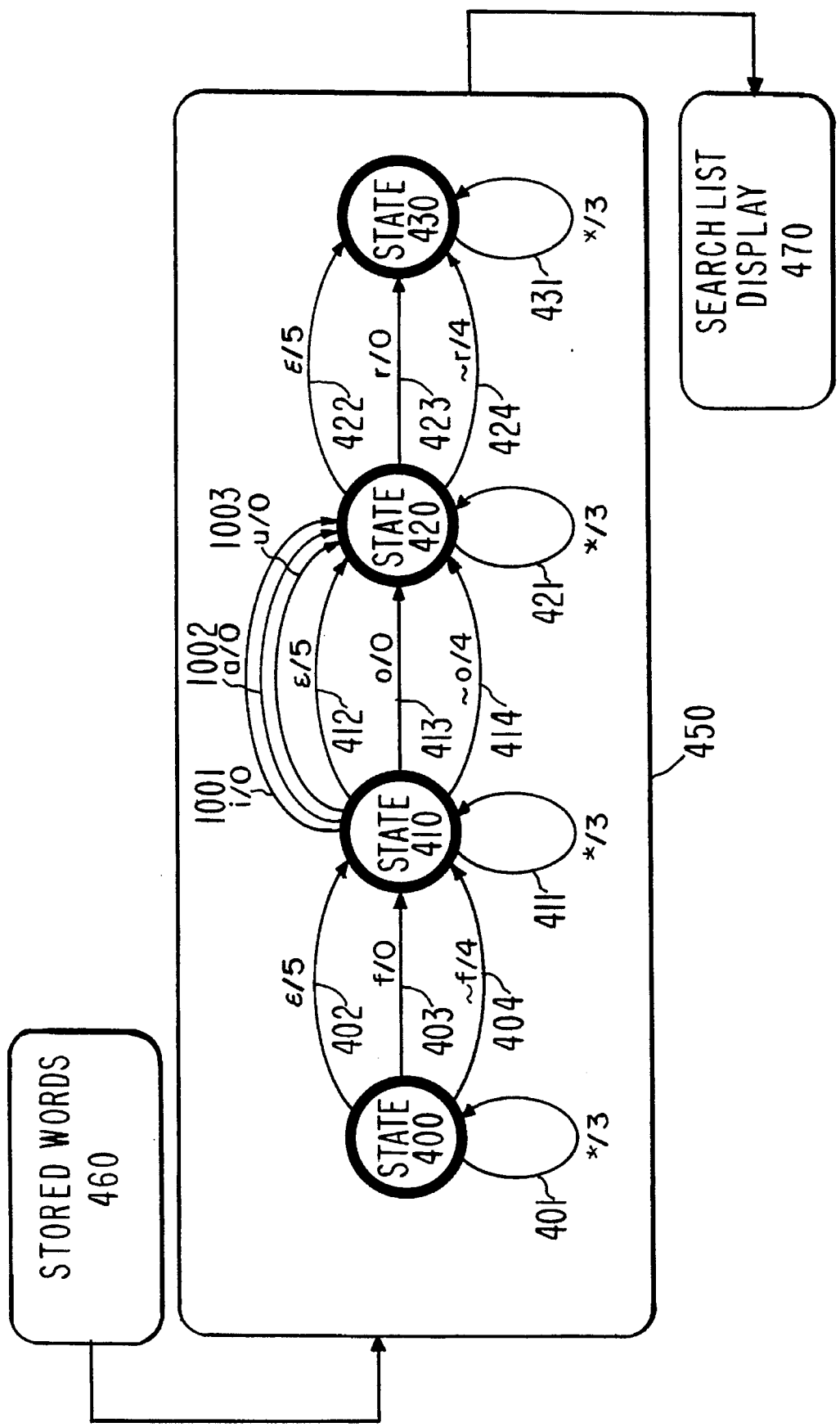
FIG. 10 shows a state diagram of a finite non-deterministic automaton featuring processing of multiple allowable characters, in accordance with the present invention.

Sets of characters. Fuzzy non-deterministic finite-state automata are able to perform searches for patterns in which portions of the pattern are permitted to be selected from sets of characters. FIG. 10 illustrates a fuzzy non-deterministic finite-state automaton for detecting the words "far", "fir", "for", and "fur" as perfect matches. FIG. 10 is identical to FIG. 4 except that rules 1001, 1002, and 1003 have been added to permit a zero-penalty transition from state 410 to state 420 when characters "a", "i", "o", or "u" are received. Since each of these rules has equal penalty values, in this case 0 penalty, no augmentations or additions to rule 414 are necessary. The minimization of marked next-values ensures that the rules 1001, 1002, and 1003 dominate rule 414 for processing of the characters "i", "a" and "u".

Penalties associated with OCR errors. Suppose that an OCR is known to make errors in identifying the letter "o", and that it sometimes identifies a letter "o" as the numeral "0" (zero), or as the letter "e". The technique described in the preceding paragraph ("Sets of characters") may be used to build an automaton which will identify "for", "f0r", and "fer" as perfect or near-perfect matches.

Alternatively, penalties may be associated with letters based upon the frequency with which the OCR system confuses each such letter with the letter "o". In such instance, more common errors would be assigned a lower penalty. For instance, if the letter "o" is often misread by the OCR system as the numeral "0", and nearly as often misread as the letter "e", a fuzzy, finite-state, non-deterministic automaton could be created permitting a transition from a first state to a second state with a penalty of 0 (zero) if the letter "o" is received, a penalty of 1 if the numeral "0" is received, and a penalty of 2 if the letter "e" is received.

Figure 11:
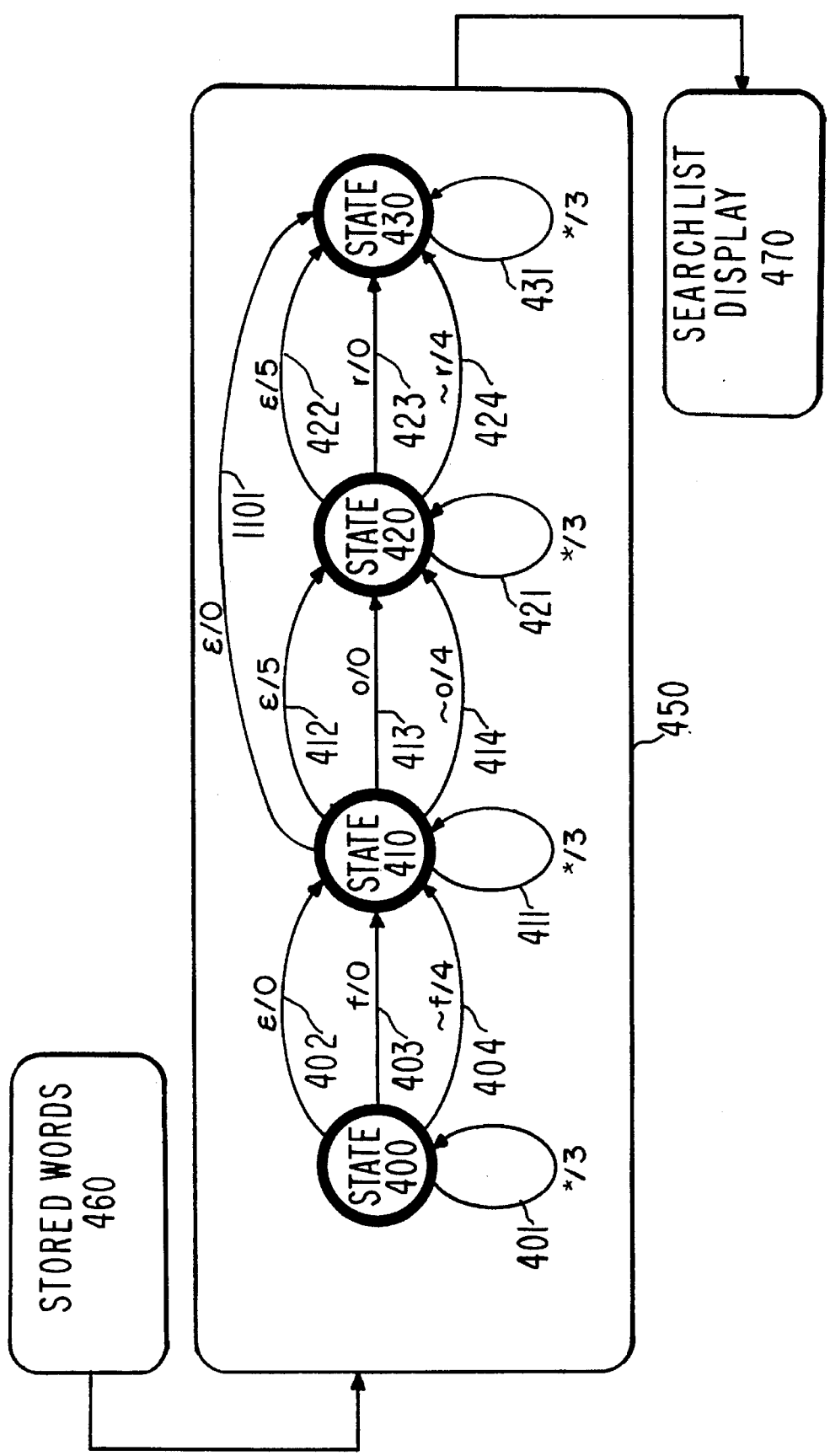
FIG. 11 shows a state diagram of a finite non-deterministic automaton featuring processing of multiple allowable character segments, in accordance with the present invention.

Matching segments of a search term. Suppose that a search is desired for information about a phenomenon which has been termed "psychosocial", and it is desired for each of the strings "psychosocial", "psycho", and "social" to be identified as perfect matches. Fuzzy non-deterministic finite-state automata are capable of performing such searches. For simplicity, instead of looking for "psychosocial", assume that a search is desired for the word "for", but that either "f" or "or" would also be considered perfect matches. FIG. 11 illustrates a fuzzy non-deterministic finite-state automaton which performs such a search. Rule 402 permits a zero-penalty transition from the initial state 400 to state 410 without any incoming character. This allows state 410 to act as though it were an initial state, permitting "or" to be identified as a perfect match. Rule 1101 permits a zero-penalty transition from state 410 to state 430 without any incoming character. This allows state 410 to act as though it were a terminal state, permitting "f" to be identified as a perfect match. It should be clear that the entire expression "for" is also recognized as a perfect match, thereby achieving the desired search.

Suppose, similarly, that a search for "mother-in-law" is desired, and that each of the strings "mother-in-law", "mother-in", "in-law", "mother", "in", or "law" is desired to be identified as a perfect match. This may be accomplished by making the states from which the "i" and the "l" are detected act as though they were initial states, by including zero-penalty transitions which function without any character being received to each of these states from the initial state. In addition, the states reached by the detection of the "r" and by the "n" may be configured to act as terminal states, by including zero-penalty transitions which function without any character being received from each of these two states to the terminal state.

Figure 12:
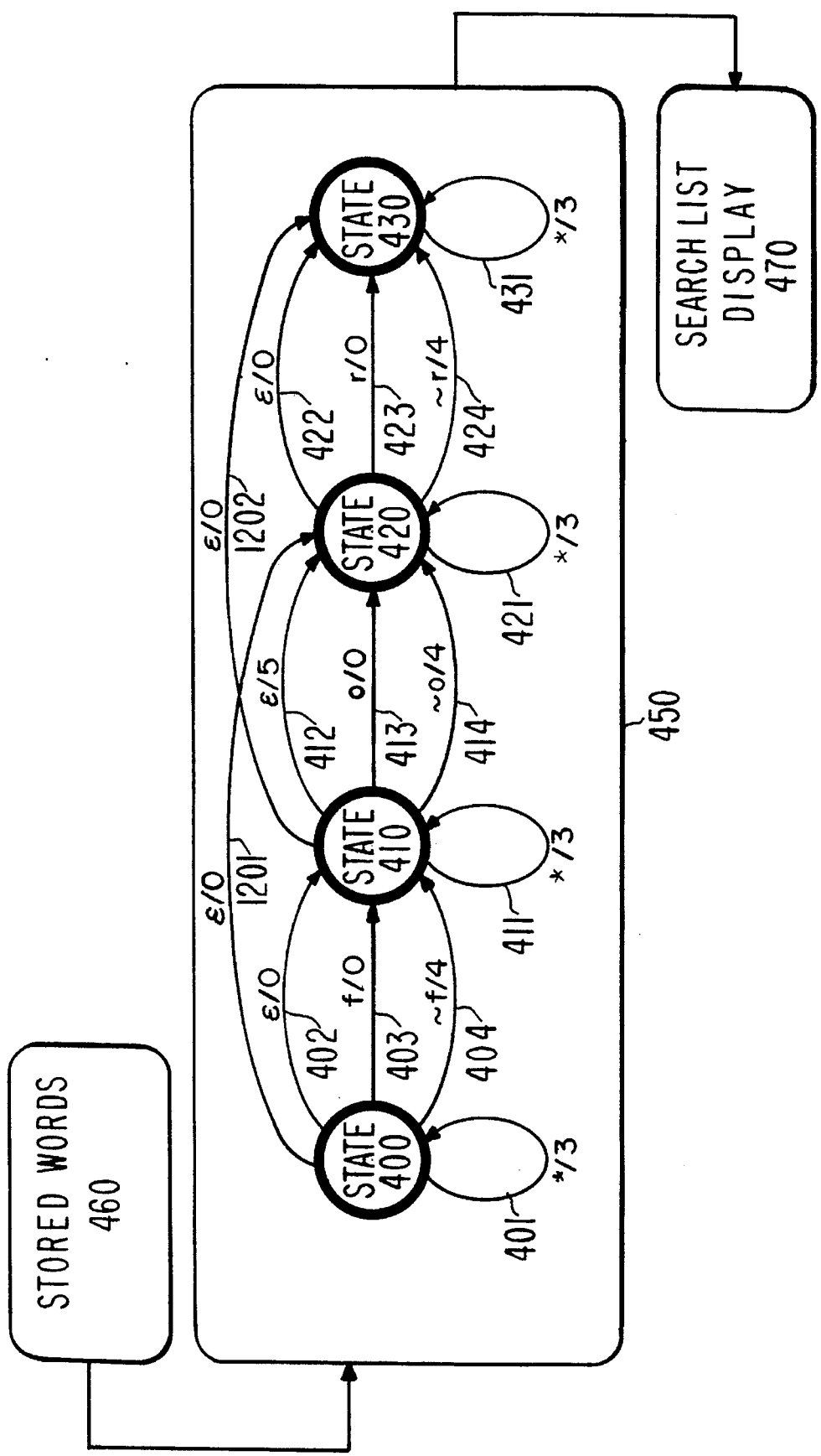
FIG. 12 shows a state diagram of another finite non-deterministic automaton featuring processing of multiple allowable character segments, in accordance with the present invention.

For simplicity, instead of looking for "mother-in-law", assume that a search for the word "for" is desired, but that we would also consider "fo", "or", "f", "o", or "r" as perfect matches. FIG. 12 illustrates a fuzzy non-deterministic finite-state automaton which performs such a search. Rule 402 permits a zero-penalty transition from the initial state 400 to state 410 without any incoming character. This allows state 410 to act as though it were an initial state, permitting "o" to act as though it were an initial character. Rule 1201 permits a zero-penalty transition from the initial state 400 to state 420 without any incoming character. This allows state 420 to act as though it were an initial state, permitting "r" to act as though it were an initial character. Rule 1202 permits a zero-penalty transition from state 410 to state 430 without any incoming character. This allows state 410 to act as though it were a terminal state. Rule 422 permits a zero-penalty transition from state 420 to state 430 without any incoming character. This allows state 420 to act as though it were a terminal state.

Figure 13:
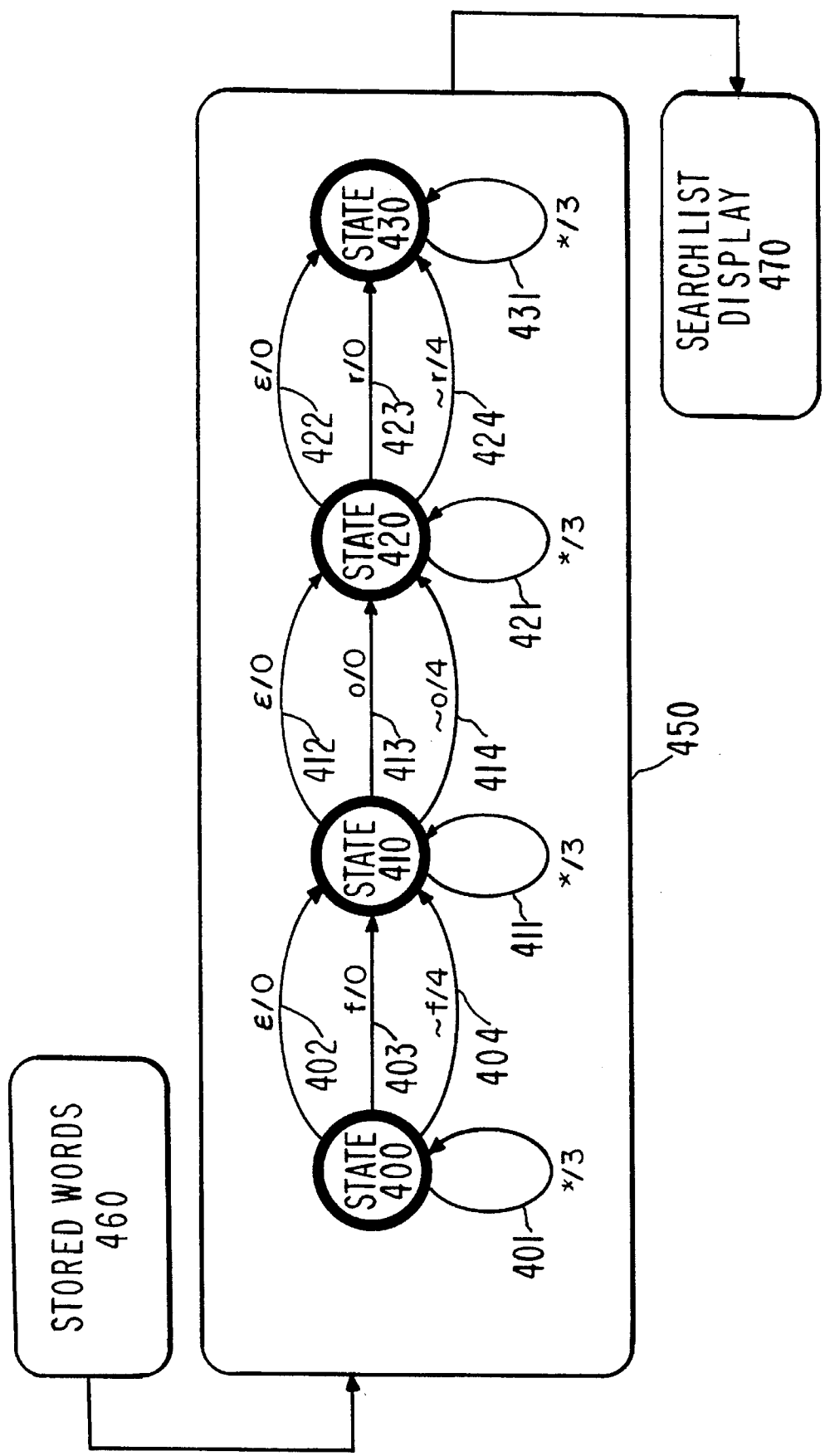
FIG. 13 shows a state diagram of a third finite non-deterministic automaton featuring processing of multiple allowable character segments, in accordance with the present invention.

FIG. 13 solves a problem similar to the fuzzy automaton of FIG. 12, except that also identifies "fr" as a perfect match. Unlike the situation in FIG. 11, a perfect match does not have to consist of a series of adjacent characters. In this automaton illustrated in FIG. 13, state 400 is an initial state, but rules 402 and 412 enable states 410 and 420 to also act as though they were initial. Similarly, rules 412 and 422 enable states 410 and 420 to act as though they were terminal states, although state 430 is the only true terminal state.

Exchanged adjacent characters. The fuzzy automaton illustrated in FIG. 4 is intended to identify the word "for" as a perfect match. If the target word is "ofr" (i.e., adjacent characters "f" and "o" have been exchanged) or if the target word is "fro" (i.e., adjacent characters "o" and "r" have been exchanged), the dissimilarity value is calculated as 8 (the sum of the penalties for an extra character and a missing character). Exchanging adjacent characters is a frequently encountered typing or spelling error, so it may be desired to assign a lower penalty level to such an error.

Figure 14:
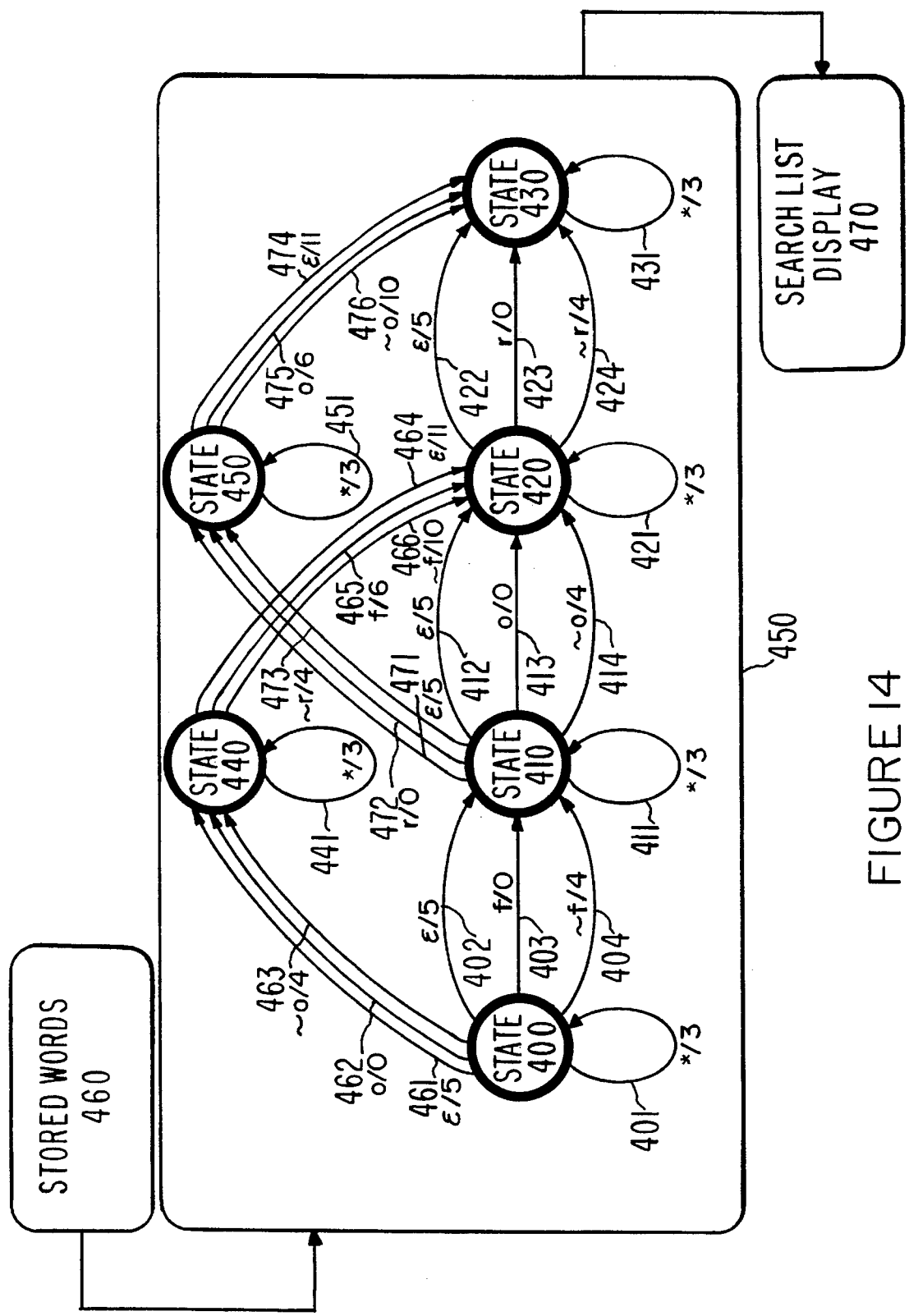
FIG. 14 shows a state diagram of a finite non-deterministic automaton featuring processing of exchanged adjacent allowable characters, in accordance with the present invention.

FIG. 14 illustrates an automaton that identifies "for" as a perfect match (i.e., with zero penalty), but which assigns a penalty of 6 in case either the "f" and "o" have been interchanged, or the "o" and "r" have been interchanged. Note that if "fo" is encountered at the beginning of the incoming stream, states 400, 410, and then 420 are successively assigned a value of 0. However, if "of" is encountered at the beginning of the incoming stream, states 440, and 440 are successively assigned a value of 0, and then state 430 is assigned a value of 6.

Similarly, the sequence of states 410, 420, and 430 provides for the processing of the sequence of characters "or" without penalty. However, the sequence of states 410, 450, and 430 provides for the processing of the sequence of characters "ro" with a penalty of 6.

The process of providing an alternate route, one which has a weight smaller than the sum of the weights for an extra character and for a missing character, may be applied to any and all pairs of successive paths in a fuzzy automaton in order to assign a special penalty for exchanged adjacent characters.

Target words containing hyphens or ambiguous spaces. It is often the case that OCR errors occur in the detection of spaces between words. Perhaps the word "for" has been read as though it may contain a space between the "f" and the "or", so that there may be two words "f" and "or". Since there may be no way of knowing whether a space was intended between the "f" and the "or", it may be desirable to achieve a hit when searching for any of "for", "f", or "or".

Considering for the moment a different situation, suppose that in a key-entered document "self-" is encountered at the end of a line, and "confident" is encountered at the beginning of the next line. Suppose that the computer is unable to determine whether the hyphen is a required part of a word "self-confident" or whether it has been key-entered only because the word continues from one line to the next. This problem may be addressed by treating a hyphen in the target text as though it were an ambiguous space. The word "self-confident" in the document should result in a perfect match during a search for any of the words "selfconfident", "self-confident", "self", or "confident.".

Figure 15:
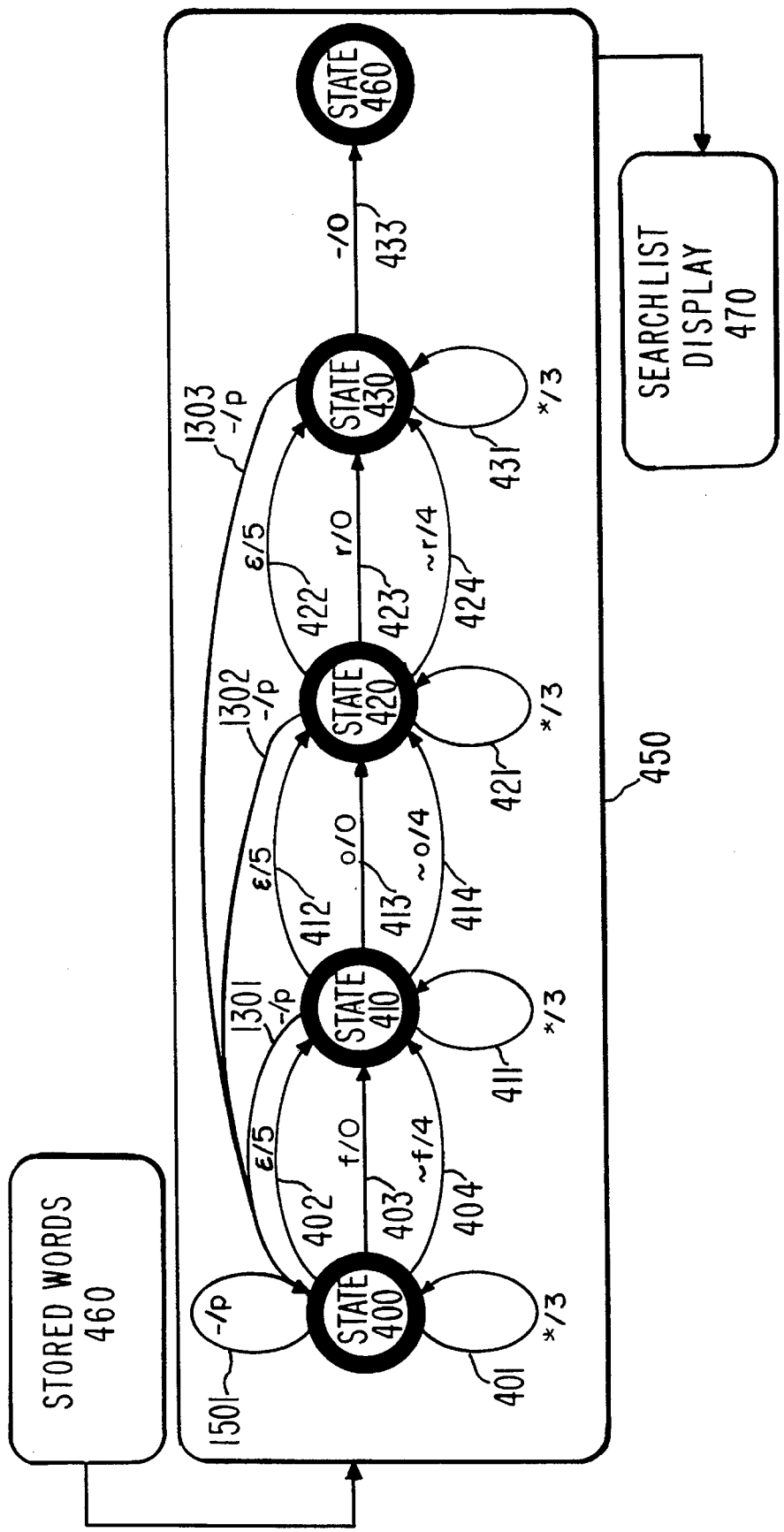
FIG. 15 shows a state diagram of a finite non-deterministic automaton featuring processing of allowable hyphens and ambiguous spaces, in accordance with the present invention.

FIG. 15 shows an automaton that identifies the target word "for", but which also results in a perfect match if "for-lorn" is found in the document, if "be-for" is found in the document, if "for lorn" (containing an ambiguous space) is found in the document, if "be for" (containing an ambiguous space) is found in the document, if "f-or" is found in the document, or if "f or" (containing an ambiguous space) is found in the document.

Before applying the automaton illustrated in FIG. 15, a hyphen should be inserted at the beginning of the target word, and another hyphen should be appended at the end of the target word. Each hyphen or ambiguous space encountered, including these added initial and terminal hyphens, activate transition rule 433 (described below), a transaction that takes places whenever a hyphen or ambiguous space is encountered.

FIG. 15 includes a state 460 that serves as a terminal state. Rule 433 shows that there is a zero-penalty transition from state 430 to state 460 without processing any incoming character. Rule 1501 provides for a zero-penalty transition from initial state 400 to itself when a hyphen or an ambiguous space is processed. The notation "–/ρ" associated with rule 1501 indicates that the value associated with state 400 is to be reset to zero whenever a hyphen or ambiguous space is encountered in the incoming string so transition rule 1501 can be used. Rules 1301, 1302, and 1303 provide a transition back to initial state 400 when a hyphen or ambiguous space is encountered in the incoming string. Here, too, the notation "–/ρ" indicates that the value associated with state 400 is to be reset to zero whenever any of the rules 1301, 1302, and 1303 is used as the result of a hyphen or ambiguous space being encountered. The effect of rules 1501, 1301, 1302, and 1303 is to cause a character following a hyphen or ambiguous space in a target word to be treated as though it could be regarded as the initial character in the incoming stream.

The notation "–/0" associated with rule 433 indicates that a penalty of zero is to be used when applying rule 433 as the result of encountering a hyphen or ambiguous space in the incoming stream. The effect of this rule is to treat any hyphen or ambiguous space in a target word as though the immediately preceding character were the final character in the incoming stream. The insertion of an extra hyphen at both the beginning and end of the target word (as described above) ensures that rule 433 is also applied after the automaton has been initialized, and after all the original characters in the target word have been processed. The value associated with state 460 after a target word has been processed in its entirety is the smallest value which had been associated with state 430 at after the processing of any hyphen or ambiguous space.

Notice that rules 1301, 1302, and 1303 create loops in the automaton. Previously the only loops which have been considered have been those which provide a transition from a single state back to itself. These special transitions back to the initial state which are triggered by processing of a hyphen or ambiguous space are to be disregarded in assigning a sequential order to the states 400, 410, 420, 430, and 460.

Whereas the description so far has been for the case of a single regular expression (e.g., "for"), the case of multiple regular expressions (e.g., "for love") evokes particular techniques, especially as regards the calculation and presentation of overall metric values for individual documents that contain matches to the constituent regular expressions in a compound search expression.

A multiple regular fuzzy search expression is comprised of a set of one or more fuzzy search terms. Each fuzzy search term in the search expression is associated with several possible found words. Those found words are strings in the target document set which are identified by the fuzzy finite-state, non-deterministic automaton technique to be "close" to the fuzzy search term. Each found word is given an individual metric value by that process. That metric is a measure of the distance between the found word and its associated fuzzy search term. As explained previously, this found word metric is defined as an accumulated penalty that is accrued as a function of the minimal application of conversion rules from a set of such rules, each of which has its own penalty value.

For each fuzzy search term in the search expression, the user selects zero or more of those found words as being useful in the identification and presentation of documents that contain them. In an alternate embodiment, an algorithm follows a user-established policy to automatically select suitable found words, such as the best N found words for each fuzzy search term. At least one such found word must be selected from the entire set of found words for all the fuzzy search terms in the fuzzy search expression. In another embodiment, at least one such found word must be selected from each specific set of found words for each of the fuzzy search terms in the fuzzy search expression. The required set of selections may also be influenced by logical and other operators that establish desired relations between fuzzy search terms, such as OR, AND, and proximity constraints.

The documents that contain one or more of the selected found words are presented to the user in a list. Each document has instance counts for each found word that is contained in that document. A metric value is assigned to each document to allow the set of documents to be sorted prior to presentation, and to assist the user in evaluating the suitability of each document in that list with respect to the compound search expression. The user can then select documents from the list for viewing, printing, further searching or other uses.

In a preferred embodiment, the metric that is associated with a document is calculated as a number on the unit interval: [0.0, 1.0]. The calculation of this document metric is based on the individual metric values and instance counts of the constituent found words that are determined to be "close" to the terms in the compound search expression, selected for suitability by the user, and found to be contained in the document. Specifically, the calculation involves six steps. The first step is to convert the penalty values for each found word into a different form via a formula such as:

$$new\_metric = (1.0/(1.0+(penalty/12.0))) \quad \text{(Eq. 3)}$$

Thus, a penalty value of zero, which corresponds to an exact match between the fuzzy search term and the found word, becomes a new_metric value of unity. Non-zero penalty values corresponding to inexact matches yield new_metric values closer to zero. Any process which converts a penalty of zero into a value of unity, and larger penalties into values closer to zero is suitable in this step. The constant 12.0 is found to provide reasonable ranges for new_metric values when using suggested penalty values presented in previous examples, but other constants could also be used.

The second step is to record for each document the maximum value of new_metric from the set of new_metric values associated with the set of suitable found words that are in a document. This maximum value is determined for each document, thus recording the new_metric value for the suitable found word in that document that has the closest match with its fuzzy search term. In an alternate embodiment, the maximum value may be the product of the maximum new_metric values for each fuzzy search term in the compound search expression, where only suitable found words that have non-zero instance counts in the particular document are considered, and a default low new_metric type value is used for any fuzzy search term that is not represented by a suitable found word in that particular document. This value will be used as a limiting metric value on the document after normalization, as explained below in connection with the sixth step.

The third step is to combine the new_metric values of the found words with their respective instance counts. For each document, the sum of the products of instance counts times new_metric values for each found word in the document is calculated. In an alternate embodiment, the instance counts may each be incremented by one and a logarithm taken thereof before multiplication by their associated new_metric values.

The fourth step is to determine the maximum value of those sums across the whole set of documents that are under consideration.

The fifth step is to divide each sum by the maximum value determined in the fourth step. This normalizes the sums, so that all the normalized values are on the unit interval.

The sixth and final step is to multiply all the normalized sums by the maximum new_metric value of the document that has the largest normalized sum (that sum is necessarily of value unity for that document).

The description above has concerned searching text documents. Fuzzy finite non-deterministic state automata as described herein also may be applied to locate best matches in other environments as well, such as a mathematical search tree. For example, a fuzzy finite non-deterministic automaton may be applied to a depth-first tree search in a generalized optimization problem.

It should also be recognized that just as the weights discussed above in connection with FIGS. 2A and 2B may be adaptively modified, so may penalty values associated with transition rules, e.g., 401.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for selectively retrieving information, including a plurality of stored text strings that do not have to be presorted, said stored text strings contained in a document set stored on a data storage medium and accessible by a computer processor, the method comprising the steps of:

A. transmitting a user-defined text string query to the processor;

B. constructing a fuzzy finite non-deterministic fixed-size automaton corresponding to said query, wherein said automaton has at least two states, each state can have more than two values, and more than one state can be active simultaneously;

C. applying each distinct stored text string individually and sequentially to said automaton just once and generating thereby an accumulated dissimilarity metric associated with each distinct text string in the stored document set; and D. displaying a subset of the distinct stored text strings, said subset based upon values of the accumulated dissimilarity metrics.

2. The method of claim 1, wherein constructing the automaton includes providing a facility for adding a transition penalty value to the accumulated dissimilarity metric associated with a text string in the stored document set for predetermined differences between said query and said text string, which differences can exist with respect to any point within said text string.

3. The method of claim 2, wherein the predetermined differences include missing characters.

4. The method of claim 2, wherein the predetermined differences include extra characters.

5. The method of claim 2, wherein the predetermined differences include ambiguous characters.

6. The method of claim 2, wherein the predetermined differences include phonetic replacements.

7. The method of claim 2, wherein the predetermined differences include grammatical replacements.

8. The method of claim 2, wherein the predetermined differences include changes in capitalization.

9. The method of claim 2, wherein the predetermined differences include misspellings.

10. The method of claim 2, wherein the predetermined differences include exchanged adjacent characters.

11. The method of claim 2, further comprising terminating processing of said automaton with respect to one of said text strings in response to said accumulated dissimilarity metric associated with said one string achieving a maximum dissimilarity threshold value.

12. The method of claim 2, further comprising establishing an aggregate dissimilarity metric for a document in the stored document set by summing the dissimilarity metrics associated with each of the strings in the subset corresponding to the document.

13. A computer system for selectively retrieving information, including a plurality of stored text strings that do not have to be presorted, said text strings contained in a document set stored on a data storage medium and accessible by a computer processor, the system comprising:

A. a data input device providing a user-defined text string query to the processor;
   B. a fuzzy non-deterministic fixed-size automaton corresponding to said query, adapted to accept as input each distinct stored text string and to produce in response a dissimilarity metric associated with each distinct stored text string, wherein said automaton has at least two states, each state can have more than two values, and more than one state can be active simultaneously; and
   C. a display device displaying a subset of the distinct stored text strings, said subset based upon values of the dissimilarity metrics.

14. The system of claim 13, wherein the automaton is constructed to add a penalty value to the dissimilarity metric associated with a text string in the stored document set for predetermined differences between said query and said text string, which differences can exist with respect to any point within the text string.

15. The system of claim 14, wherein the predetermined differences include missing characters.

16. The system of claim 14, wherein the predetermined differences include extra characters.

17. The system of claim 14, wherein the predetermined differences include unrecognizable characters.

18. The system of claim 14, wherein the predetermined differences include phonetic replacements.

19. The system of claim 14, wherein the predetermined differences include grammatical replacements.

20. The system of claim 14, wherein the predetermined differences include changes in capitalization.

21. The system of claim 14, wherein the predetermined differences include misspellings.

22. The system of claim 14, wherein the predetermined differences include exchanged adjacent characters.

23. The system of claim 14, wherein the automaton terminates processing with respect to one of said text strings in response to said dissimilarity metric associated with said one string achieving a maximum dissimilarity threshold value.

24. The system of claim 14, wherein the automaton establishes an aggregate dissimilarity metric for a document in the stored document set by summing the dissimilarity metrics associated with each of the strings in the subset corresponding to the document.

25. The method of claim 1 wherein said text string query can contain non-literal expressions.

26. The system of claim 13 wherein said text string query can contain non-literal expressions.

* * * * *